US012430714B2

(12) United States Patent
Das et al.

(10) Patent No.: US 12,430,714 B2
(45) Date of Patent: Sep. 30, 2025

(54) METHOD AND ELECTRONIC DEVICE FOR MULTI-FUNCTIONAL IMAGE RESTORATION

(71) Applicant: Samsung Electronics Co., Ltd., Suwon-si (KR)

(72) Inventors: Saikat Kumar Das, Bengaluru (IN); Sai Kumar Reddy Manne, Bengaluru (IN); Pankaj Kumar Bajpai, Bengaluru (IN); Rishikesh Jha, Bengaluru (IN); Alok Shankarlal Shukla, Bengaluru (IN); Shashavali Doodekula, Bengaluru (IN); Siddharth Deepak Roheda, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 807 days.

(21) Appl. No.: 17/731,575

(22) Filed: Apr. 28, 2022

(65) Prior Publication Data
US 2022/0351334 A1    Nov. 3, 2022

(30) Foreign Application Priority Data

Apr. 29, 2021   (IN) .............................. 202141019618
Apr. 1, 2022    (IN) ............................ 2021 41019618

(51) Int. Cl.
    *G06T 5/50*    (2006.01)
    *G06T 5/60*    (2024.01)
    *G06T 7/11*    (2017.01)
(52) U.S. Cl.
    CPC .................. *G06T 5/50* (2013.01); *G06T 5/60* (2024.01); *G06T 7/11* (2017.01);
    (Continued)

(58) Field of Classification Search
    CPC ..... G06T 5/00; G06T 7/11; G06T 5/50; G06T 2207/20004; G06T 2207/20084; G06T 2207/20212
    See application file for complete search history.

(56) References Cited

U.S. PATENT DOCUMENTS 8,107,765 B2    1/2012   Hwang et al.
8,855,195 B1    10/2014  Kelly
                (Continued)

FOREIGN PATENT DOCUMENTS

KR    10-2020-0132682 A    11/2020
WO       2021230708 A1     11/2021

OTHER PUBLICATIONS

Indian Office Action dated Feb. 16, 2023, issued in Indian Patent Application No. 202141019618.

*Primary Examiner* — David Perlman
(74) *Attorney, Agent, or Firm* — Jefferson IP Law, LLP

(57) ABSTRACT

A method for performing multi-functional image restoration by an electronic device with a trained Machine Learning (ML) model is provided. The method includes receiving an image and determining channels of the image, and determining whether a number of restructuring needed for the channels is one. When the restructuring needed for the channels not one, then the method includes restructuring each channel into a first channel set, generating first inferences of the image corresponding to each channel by feeding the first channel set to the trained ML model, and generating a final inference image by combining the first inferences. When the number of restructuring needed for the channels is one, then the method includes restructuring the channels into a second channel set, and generating a second inference of the image by feeding the second channel set to the trained ML model.

18 Claims, 14 Drawing Sheets

(52) U.S. Cl.
CPC ............... *G06T 2207/20004* (2013.01); *G06T 2207/20081* (2013.01); *G06T 2207/20084* (2013.01); *G06T 2207/20212* (2013.01)

(56) References Cited

U.S. PATENT DOCUMENTS

| | | |
|---|---|---|
| 10,783,617 B2 | 9/2020 | Glotzbach et al. |
| 2018/0018554 A1* | 1/2018 | Young .................... G06N 3/084 |
| 2019/0005619 A1 | 1/2019 | Michelini et al. |
| 2019/0163717 A1* | 5/2019 | Li ......................... G06N 20/10 |
| 2020/0053276 A1 | 2/2020 | Kim et al. |

* cited by examiner

FIG. 6C
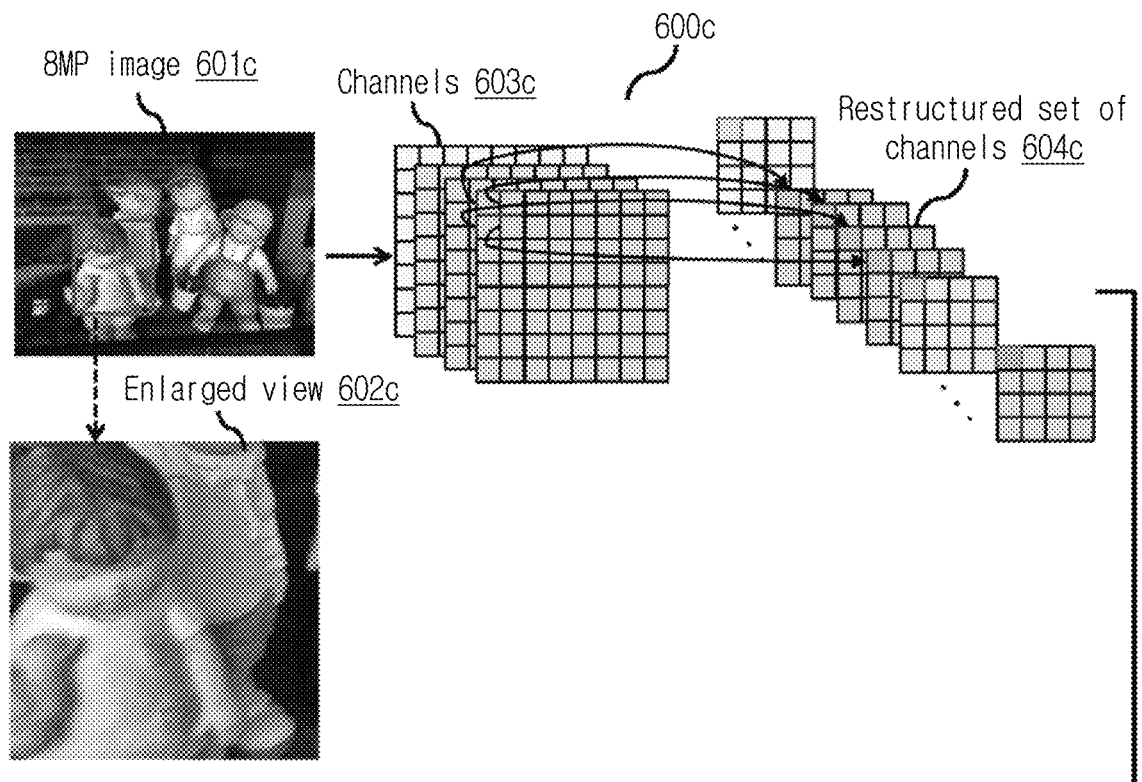
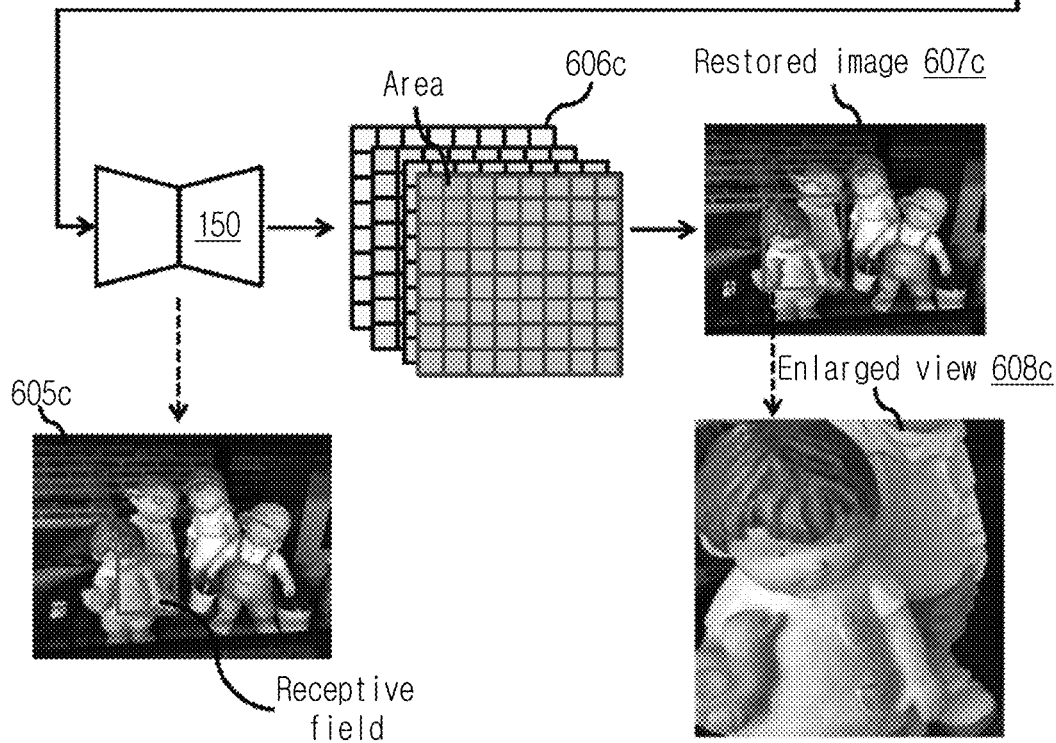

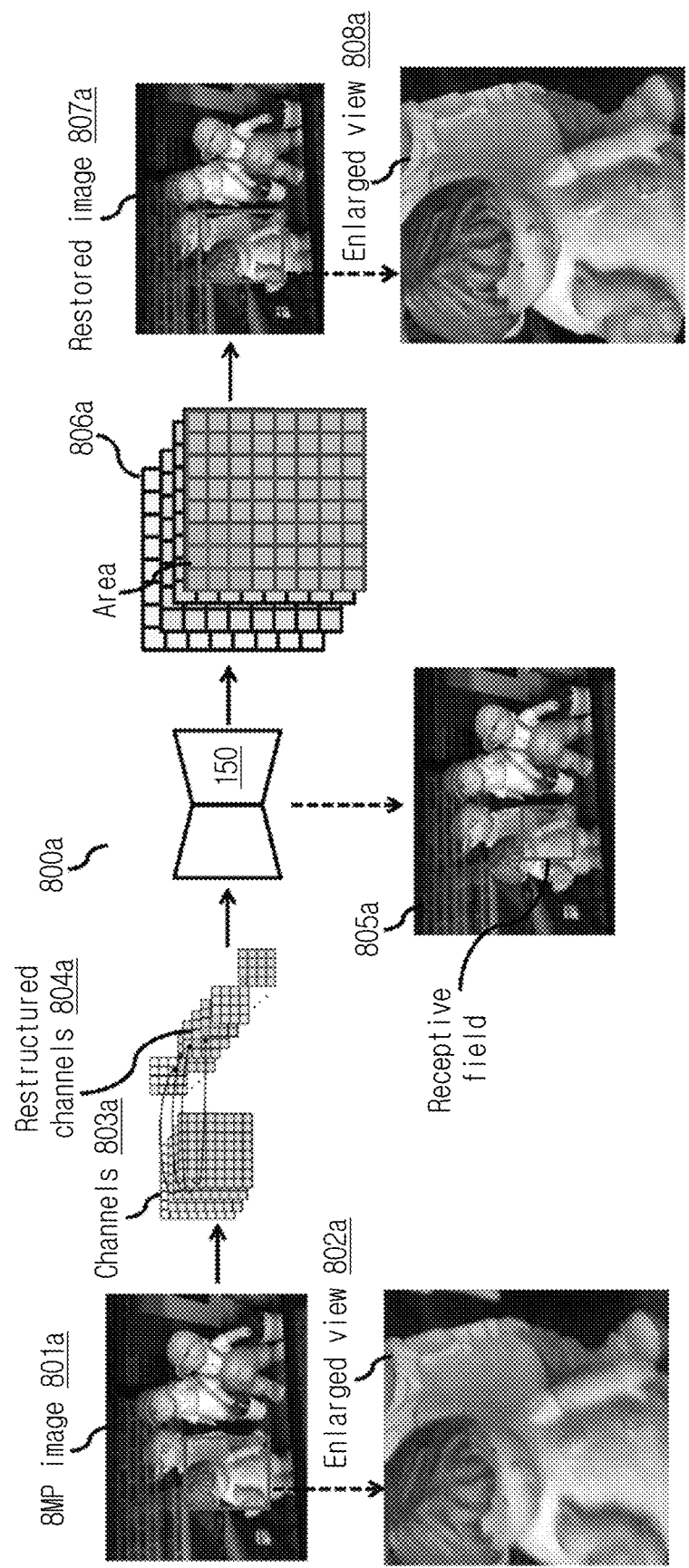

METHOD AND ELECTRONIC DEVICE FOR MULTI-FUNCTIONAL IMAGE RESTORATION

CROSS-REFERENCE TO RELATED APPLICATION(S)

This application is based on and claims priority under 35 U.S.C. § 119(a) of an Indian Provisional patent application number 202141019618, filed on Apr. 29, 2021, in the Indian Patent Office, and of an Indian Complete patent application number 202141019618, filed on Apr. 1, 2022, in the Indian Patent Office, the disclosure of each of which is incorporated by reference herein in its entirety.

BACKGROUND

1. Field

The disclosure relates to an electronic device. More particularly, the disclosure relates to a method and the electronic device for multi-functional image restoration.

2. Description of Related Art

Generally, developers train a conventional neural network model with an image with a constant resolution. Such conventional neural network model provides an optimal output for an input image with the resolution at which the conventional neural network was trained. However, the trained deep learning model fails to provide the optimal output for the input image with a higher or lower resolution compared to the resolution at which the conventional deep learning model was trained.

In an existing system, a multiscale neural network model is proposed for handling the higher resolution image. A configuration of the multiscale neural network model of the system has to dynamically change according to varying resolutions of the image. However, resources of the system are always limited to handle the dynamically changing configuration of the multiscale neural network model, which is not feasible. Most of on-device configurations of the multiscale neural network model are locked at compilation time and the system has low access for dynamically changing the on-device configurations. Hence, it is desired to provide a solution for handling images with arbitrary resolution for obtaining the optimal output from the conventional neural network model without redesigning/retraining the conventional neural network model or without changing configurations of the convolutional neural network model.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an electronic device for restoration, enhancement, and segmentation of an input image with an arbitrary resolution using a trained Machine Learning (ML) model. The electronic device uses the single trained ML model to perform different tasks with different coarse and fine details either parallel or sequentially. The restoration, enhancement, and segmentation of the image are achieved by restructuring channels of the input image acceptable to the trained ML model. Thus, the trained ML model need not to redesign/retrain or change configurations of the trained ML model for handling input images with different resolutions. The proposed method replaces requirement of multiple Deep Neural Network (DNNs) for performing similar tasks by using the single trained ML model, which reduces a model memory footprint on a memory of the electronic device.

Additional aspects will be set forth in part in the description which follows and, in part, will be apparent from the description, or may be learned by practice of the presented embodiments.

In accordance with an aspect of the disclosure, a method for multi-functional image restoration by an electronic device with a trained Machine Learning (ML) model is provided. The method includes receiving, by the electronic device, an image, determining, by the electronic device, a plurality of channels of the image, and determining, by the electronic device, whether a number of restructuring needed for the plurality of channels of the image is one. In response to determining that the number of restructuring needed for the plurality of channels of the image is not one, the method includes restructuring each channel of the plurality of channels into a first set of channels based on an input layer size of the trained ML model, generating first inferences of the image corresponding to each channel by feeding the first set of channels to the trained ML model, and generating a final inference image by combining the first inferences. In response to determining that the number of restructuring needed for the plurality of channels of the image is one, the method includes restructuring the plurality of channels into a second set of channels based on the input layer size of the trained ML model, and generating a second inference of the image by feeding the second set of channels to the trained ML model.

In an embodiment, where restructuring each channel of the plurality of channels into the first set of channels based on the input layer size of the trained ML model, comprises spatially segmenting, by the electronic device, each channel of the plurality of channels separately into the first set of channels based on the input layer size of the trained ML model.

In an embodiment, where restructuring the plurality of channels into the second set of channels based on the input layer size of the trained ML model, comprises spatially segmenting, by the electronic device, the plurality of channels together into the second set of channels based on the input layer size of the trained ML model.

In accordance with another aspect of the disclosure, a method for image segmentation by the electronic device with the trained ML model is provided. The method includes receiving, by the electronic device, an image, determining, by the electronic device, a plurality of first channels of the image, restructuring, by the electronic device, each channel of the plurality of first channels based on an input layer size of the trained ML model, generating, by the electronic device, a coarse segmented image by feeding a reconstructed set of channels of the plurality of first channels that provide a coarse but broader contextual information for operation, to the trained ML model, determining, by the electronic device, a plurality of second channels of the coarse segmented image, restructuring, by the electronic device, the plurality of second channels based on the input layer size of the trained ML model, and generating, by the electronic device, a fine segmented image by feeding a reconstructed set of channels of the plurality of second channels that provide a finer but narrower and detailed information for operation, to the trained ML model.

In an embodiment, where restructuring, by the electronic device, each channel of the plurality of first channels based on an input layer size of the trained ML model, comprises spatially segmenting, by the electronic device, each channel of the plurality of first channels separately based on the input layer size of the trained ML model.

In an embodiment, where restructuring, by the electronic device, the plurality of second channels based on the input layer size of the trained ML model, comprises spatially segmenting, by the electronic device, the plurality of second channels together based on the input layer size of the trained ML model.

In accordance with another aspect of the disclosure, a method for multi-functional image enhancement by the electronic device with the trained ML model is provided. The method includes receiving, by the electronic device, an image, determining, by the electronic device, a plurality of channels of the image, identifying, by the electronic device, a first set of channels in the plurality of channels needs a under exposure correction or a global scale feature restoration, restructuring, by the electronic device, each channel of the first set of channels based on an input layer size of the trained ML model, generating, by the electronic device, a first inference of the image by feeding a reconstructed set of channels of the first set of channels that provide a global scale information for operation, to the trained ML model, identifying, by the electronic device, a second set of channels in the plurality of channels needs an over exposure correction or a local context restoration, restructuring, by the electronic device, the second set of channels based on the input layer size of the trained ML model, generating, by the electronic device, a second inference of the image by feeding a reconstructed set of channels of the second set of channels that provide a global scale information for operation, to the trained ML model, and generating, by the electronic device, an exposure corrected image or a restored image by combining the first inference and the second inference.

In an embodiment, where restructuring, by the electronic device, each channel of the first set of channels based on the input layer size of the trained ML model, comprises spatially segmenting, by the electronic device, each channel of the first set of channels separately based on the input layer size of the trained ML model.

In an embodiment, where restructuring, by the electronic device, the second set of channels based on the input layer size of the trained ML model, comprises spatially segmenting, by the electronic device, the second set of channels together based on the input layer size of the trained ML model.

In accordance with another aspect of the disclosure, an electronic device for the multi-functional image restoration with the trained ML model is provided. The electronic device includes a channel restructuring engine, a memory, a processor, and the trained ML model, where the channel restructuring engine is coupled to the memory and the processor. The channel restructuring engine is configured for receiving the image. The channel restructuring engine is configured for determining the plurality of channels of the image. The channel restructuring engine is configured for determining whether the number of restructuring needed for the plurality of channels of the image is one. In response to determining that the number of restructuring needed for the plurality of channels of the image is not one, the channel restructuring engine is configured for restructuring each channel of the plurality of channels into the first set of channels based on the input layer size of the trained ML model, where clusters of pixels of each channel of the plurality of channels are segmented into individual set of channels in a pre-ordained pattern, where a cluster size and the pattern are controlled based on a relation between a resolution of the plurality of channels and the size of input layer of the ML model, generating first inferences of the image corresponding to each channel by feeding the first set of channels to the trained ML model, and generating the final inference image by combining the first inferences. In response to determining that the number of restructuring needed for the plurality of channels of the image is one, the channel restructuring engine is configured for restructuring the plurality of channels into the second set of channels based on the input layer size of the trained ML model, and generating the second inference of the image by feeding the second set of channels to the trained ML model.

In accordance with another aspect of the disclosure, an electronic device for the image segmentation with the trained ML model is provided. The electronic device includes the channel restructuring engine, the memory, the processor, and the trained ML model, where the channel restructuring engine is coupled to the memory and the processor. The channel restructuring engine is configured for receiving the image. The processor is configured to determine the plurality of first channels of the image, restructure each channel of the plurality of first channels based on the input layer size of the trained ML model, generate the coarse segmented image by feeding the reconstructed set of channels of the plurality of first channels to the trained ML model, determine the plurality of second channels of the coarse segmented image, restructure the plurality of second channels based on the input layer size of the trained ML model, and generate the fine segmented image by feeding the reconstructed set of channels of the plurality of second channels to the trained ML model.

In accordance with another aspect of the disclosure, an electronic device for the multi-functional image enhancement with the trained ML model is provided. The electronic device includes the channel restructuring engine, the memory, the processor, and the trained ML model, where the channel restructuring engine is coupled to the memory and the processor. The processor is configured to receive the image, determine the plurality of channels of the image, identify that the first set of channels in the plurality of channels needs the under-exposure correction or the coarse feature restoration, restructure each channel of the first set of channels based on the input layer size of the trained ML model, generate the first inference of the image by feeding the reconstructed set of channels of the first set of channels to the trained ML model, identifying that the second set of channels in the plurality of channels needs the over exposure correction or the fine feature restoration, restructure the second set of channels based on the input layer size of the trained ML model, generate the second inference of the image by feeding the reconstructed set of channels of the second set of channels to the trained ML model, and generate the exposure corrected image or the restored image by combining the first inference and the second inference.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A, 6B and 6C illustrate a comparison of handling images of different resolutions by a device and the electronic device, according to various embodiments of the disclosure;

FIGS. 8A, 8B and 8C illustrate a comparison of handling the images of different resolutions by the device and the proposed electronic device, according to various embodiments of the disclosure;

The same reference numerals are used to represent the same elements throughout the drawings.

DETAILED DESCRIPTION

Figure 1:
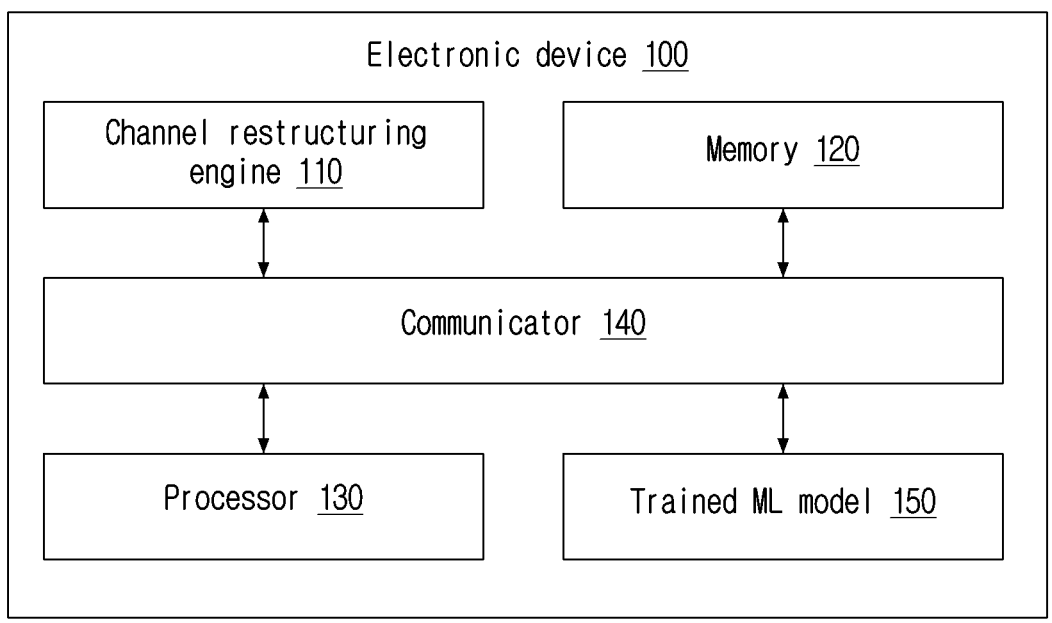
FIG. 1 is a block diagram of an electronic device for restoring, enhancing, and segmenting an image with an arbitrary resolution using a trained ML model, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "trained ML model" and "ML model" are used interchangeably and mean the same.

Accordingly, the embodiments herein provide a method for multi-functional image restoration by an electronic device with a trained Machine Learning (ML) model. The method includes receiving, by the electronic device, an image. The method includes determining, by the electronic device, a plurality of channels of the image. The method includes determining, by the electronic device, whether a number of restructuring needed for the plurality of channels of the image is one. In response to determining that the number of restructuring needed for the plurality of channels of the image is not one, the method includes restructuring each channel of the plurality of channels into a first set of channels based on an input layer size of the trained ML model, generating first inferences of the image corresponding to each channel by feeding the first set of channels to the trained ML model, and generating a final inference image by combining the first inferences. In response to determining that the number of restructuring needed for the plurality of channels of the image is one, the method includes restructuring the plurality of channels into a second set of channels based on the input layer size of the trained ML model, and generating a second inference of the image by feeding the second set of channels to the trained ML model.

Accordingly, the embodiments herein provide a method for image segmentation by the electronic device with the trained ML model. The method includes receiving, by the electronic device, an image. The method includes determining, by the electronic device, a plurality of first channels of the image. The method includes restructuring, by the electronic device, each channel of the plurality of first channels based on an input layer size of the trained ML model. The method includes generating, by the electronic device, a coarse segmented image by feeding a reconstructed set of channels of the plurality of first channels to the trained ML model. The method includes determining, by the electronic device, a plurality of second channels of the coarse segmented image. The method includes restructuring, by the electronic device, the plurality of second channels based on the input layer size of the trained ML model. The method includes generating, by the electronic device, a fine segmented image by feeding a reconstructed set of channels of the plurality of second channels to the trained ML model.

Accordingly, the embodiments herein provide a method for multi-functional image enhancement by the electronic device with the trained ML model. The method includes receiving, by the electronic device, an image. The method includes determining, by the electronic device, a plurality of channels of the image. The method includes identifying, by the electronic device, a first set of channels in the plurality of channels needs a under exposure correction or a global scale restoration. The method includes restructuring, by the electronic device, each channel of the first set of channels based on an input layer size of the trained ML model. The method includes generating, by the electronic device, a first inference of the image by feeding a reconstructed set of channels of the first set of channels to the trained ML model. The method includes identifying, by the electronic device, a second set of channels in the plurality of channels needs an over exposure correction or a local context restoration. The method includes restructuring, by the electronic device, the second set of channels based on the input layer size of the trained ML model. The method includes generating, by the electronic device, a second inference of the image by feeding a reconstructed set of channels of the second set of channels to the trained ML model. The method includes generating, by the electronic device, an exposure corrected image or a restored image by combining the first inference and the second inference.

Accordingly, the embodiments herein provide the electronic device for the multi-functional image restoration with the trained ML model. The electronic device includes a channel restructuring engine, a memory, a processor, and the trained ML model, where the channel restructuring engine is coupled to the memory and the processor. The channel restructuring engine is configured for receiving the image. The channel restructuring engine is configured for determining the plurality of channels of the image. The channel restructuring engine is configured for determining whether the number of restructuring needed for the plurality of channels of the image is one. In response to determining that the number of restructuring needed for the plurality of channels of the image is not one, the channel restructuring engine is configured for restructuring each channel of the plurality of channels into the first set of channels based on the input layer size of the trained ML model, where clusters of pixels of each channel of the plurality of channels are segmented into individual set of channels in a pre-ordained pattern, where a cluster size and the pattern are controlled based on a relation between a resolution of the plurality of channels and the size of input layer of the ML model, generating first inferences of the image corresponding to each channel by feeding the first set of channels to the trained ML model, and generating the final inference image by combining the first inferences. In response to determining that the number of restructuring needed for the plurality of channels of the image is one, the channel restructuring engine is configured for restructuring the plurality of channels into the second set of channels based on the input layer size of the trained ML model, and generating the second inference of the image by feeding the second set of channels to the trained ML model.

Accordingly, the embodiments herein provide the electronic device for the image segmentation with the trained ML model. The electronic device includes the channel restructuring engine, the memory, the processor, and the trained ML model, where the channel restructuring engine is coupled to the memory and the processor. The channel restructuring engine is configured for receiving the image. The channel restructuring engine is configured for determining the plurality of first channels of the image. The channel restructuring engine is configured for restructuring each channel of the plurality of first channels based on the input layer size of the trained ML model. The channel restructuring engine is configured for generating the coarse segmented image by feeding the reconstructed set of channels of the plurality of first channels to the trained ML model. The channel restructuring engine is configured for determining the plurality of second channels of the coarse segmented image. The channel restructuring engine is configured for restructuring the plurality of second channels based on the input layer size of the trained ML model. The channel restructuring engine is configured for generating the fine segmented image by feeding the reconstructed set of channels of the plurality of second channels to the trained ML model.

Accordingly, the embodiments herein provide the electronic device for the multi-functional image enhancement with the trained ML model. The electronic device includes the channel restructuring engine, the memory, the processor, and the trained ML model, where the channel restructuring engine is coupled to the memory and the processor. The channel restructuring engine is configured for receiving the image. The channel restructuring engine is configured for determining the plurality of channels of the image. The channel restructuring engine is configured for identifying the first set of channels in the plurality of channels needs the under-exposure correction or the coarse feature restoration. The channel restructuring engine is configured for restructuring each channel of the first set of channels based on the input layer size of the trained ML model. The channel restructuring engine is configured for generating the first inference of the image by feeding the reconstructed set of channels of the first set of channels to the trained ML model. The channel restructuring engine is configured for identifying the second set of channels in the plurality of channels needs the over exposure correction or the fine feature restoration. The channel restructuring engine is configured for restructuring the second set of channels based on the input layer size of the trained ML model. The channel restructuring engine is configured for generating the second inference of the image by feeding the reconstructed set of channels of the second set of channels to the trained ML model. The channel restructuring engine is configured for generating the exposure corrected image or the restored image by combining the first inference and the second inference.

Unlike existing methods and systems, the electronic device performs restoration, enhancement, and segmentation of the input image with an arbitrary resolution using the trained ML model. The electronic device uses the single trained ML model to execute different tasks with different coarse and fine details either parallel or sequentially. The restoration, enhancement, and segmentation of the image are achieved by restructuring channels of the input image acceptable to the trained ML model. Thus, the trained ML model need not to redesign/retrain or change configurations of the trained ML model for handling the input image with different resolutions. The proposed method replaces requirement of multiple DNNs for performing similar tasks by using the single trained ML model, which reduces a model memory footprint on a memory of the electronic device.

The method includes sequentially determining global coarse and local fine inference for semantic tasks like matting or segmentation. The electronic device performs different scopes (i.e. coarse/fine) of degradation restoration using same trained ML model by restructuring the image channels between each pass without retraining the trained ML model. The electronic device performs multi network tasks includes global and local refinements with same trained ML model for image enhancement by restructuring the image channels between each pass. The electronic device determines adaptive receptive field in the trained ML model using combination of spatial resolution folding and appropriate color spaces. The electronic device performs coarse or fine processing depending on required efficiency with same trained ML model by restructuring image channels between each pass.

Embodiments herein provide the method for adaptive image restoration of variable-resolution images with the trained and static deep learning network that can perform multiple tasks by restructuring input data. Same static deep learning network without dynamically changing the configuration of the static deep learning network can handle both global and local scopes of image enhancement. Global restoration in single pass is possible with the proposed method by reformatting structure of the image channels. The electronic device is capable for handling images with wide range of resolutions in one pass with proposed restructuring of the image channels instead of multiple passes with down sampled and up sampled input. The electronic device modifies structure of the image channels based on the resolution rather than through analysis of image texture or edges. The electronic device avoids error accumulation with multiple passes for global or local correction, and provides better accuracy results with single pass approach. Thus, the electronic device efficiently uses memory and processing power as only the single static deep learning network is required with only input data reformation which is an inexpensive operation.

Referring now to the drawings, and more particularly to FIGS. 1, through 5, 6A through 6C, 7, 8A through 8C, 9, and 10, there are shown preferred embodiments.

FIG. 1 is a block diagram of an electronic device (100) for restoring, enhancing, and segmenting an image with an arbitrary resolution using a trained ML model (150), according to an embodiment of the disclosure. Examples of the electronic device (100) include, but are not limited to a smartphone, a tablet computer, a Personal Digital Assistance (PDA), a desktop computer, an Internet of Things (IoT), a wearable device, etc. In an embodiment, the electronic device (100) includes a channel restructuring engine (110), a memory (120), a processor (130), a communicator (140), and the trained ML model (150), where the trained ML model (150) is trained to provide an optimal output for an image with a particular resolution (e.g. 1 Mega Pixel (MP)). The channel restructuring engine (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the channel restructuring engine (110) receives the image with the arbitrary resolution from a source (e.g. memory (120), an application, internet, etc.). An example of the image is a Red Green Blue Alpha (RGBA) image. The channel restructuring engine (110) determines a plurality of channels of the image. An example of the channels is color channels (i.e. red channel, blue channel, green channel). The channel restructuring engine (110) determines whether a number of restructuring needed for the plurality of channels of the image is one to provide equivalent inference quality as an intended resolution. When the channel restructuring engine (110) identifies that a spatial resolution of the plurality of channels are nearly equal to images used in training the ML model (150), then the channel restructuring engine (110) determines that the number of restructuring needed for the plurality of channels of the image is one.

The channel restructuring engine (110) restructures each channel of the plurality of channels into a first set of channels based on an input layer size of the trained ML model (150) to provide the equivalent inference quality as the intended resolution, in response to determining that the number of restructuring needed for the plurality of channels of the image is not one. When the channel restructuring engine (110) identifies that the spatial resolution of the plurality of channels is significantly higher or lower than the images used in training the ML model (150), then the channel restructuring engine (110) determines that the number of restructuring needed for the plurality of channels of the image is not one. The channel restructuring engine (110) spatially segments each channel of the plurality of channels separately into the first set of channels based on the input layer size of the trained ML model (150) for restructuring each channel, where clusters of pixels of each channel of the plurality of channels are segmented into individual set of channels in a pre-ordained pattern, where a cluster size and the pattern are controlled based on the relation between input resolution of plurality of channels and the size of input layer of the ML model. Further, the channel restructuring engine (110) generates first inferences of the image corresponding to each channel by feeding the first set of channels to the trained ML model (150). Further, channel restructuring engine (110) generates a final inference image by combining the first inferences.

The channel restructuring engine (110) restructures the plurality of channels into a second set of channels based on the input layer size of the trained ML model (150) to provide the equivalent inference quality as the intended resolution, in response to determining that the number of restructuring needed for the plurality of channels of the image is one. The channel restructuring engine (110) spatially segments the plurality of channels together into the second set of channels based on the input layer size of the trained ML model (150) for restructuring each channel. Further, the channel restructuring engine (110) generates a second inference of the image by feeding the second set of channels to the trained ML model (150).

In another embodiment, the channel restructuring engine (110) receives the image with the arbitrary resolution. Further, the channel restructuring engine (110) determines a plurality of first channels of the image. Further, the channel restructuring engine (110) restructures each channel of the plurality of first channels based on the input layer size of the trained ML model (150) to provide coarser but broader contextual segmentation information to the ML model (150). The channel restructuring engine (110) spatially segments each channel of the plurality of first channels separately based on the input layer size of the trained ML model (150) for restructuring each channel of the plurality of first channels. Further, the channel restructuring engine (110) generates a coarse segmented image by feeding a reconstructed set of channels of the plurality of first channels to the trained ML model (150). The coarse segmented image generated by segmenting the image with broader contextual information and avoiding any false positive but with lower accuracy on detailed boundary definition.

Further, the channel restructuring engine (110) determines a plurality of second channels of the coarse segmented image. Further, the channel restructuring engine (110) restructures the plurality of second channels based on the input layer size of the trained ML model (150) to provide detailed but narrower segmentation information to the ML model (150). The channel restructuring engine (110) spatially segments the plurality of second channels together based on the input layer size of the trained ML model (150) for restructuring the plurality of second channels. Further, the channel restructuring engine (110) generates a fine segmented image by feeding a reconstructed set of channels of the plurality of second channels to the trained ML model (150). The fine segmented image is generated by enhancing broader-contextual coarser segmented image boundaries with detailed and finer definition.

In another embodiment, the channel restructuring engine (110) receives the image with the arbitrary resolution. Further, the channel restructuring engine (110) determines the plurality of channels of the image. Further, the channel restructuring engine (110) identifies a first set of channels in the plurality of channels needs an under-exposure correction or a coarse feature restoration. Further, the channel restructuring engine (110) restructures each channel of the first set of channels based on the input layer size of the trained ML model (150) to provide global contextual information to the ML model (150). The channel restructuring engine (110) spatially segments each channel of the first set of channels separately based on the input layer size of the trained ML model (150) for restructuring each channel of the first set of channels. Further, the channel restructuring engine (110) generates a first inference of the image by feeding a reconstructed set of channels of the first set of channels to the trained ML model (150).

Further, the channel restructuring engine (110) identifies a second set of channels in the plurality of channels needs an over exposure correction or a fine feature restoration. Further, the channel restructuring engine (110) restructures the second set of channels based on the input layer size of the trained ML model (150) to provide local contextual information to the ML model (150). The channel restructuring engine (110) spatially segments the second set of channels together based on the input layer size of the trained ML model (150) for restructuring the second set of channels. Further, the channel restructuring engine (110) generates a second inference of the image by feeding a reconstructed set of channels of the second set of channels to the trained ML model (150). Further, the channel restructuring engine (110) generates an exposure corrected image or a restored image by combining the first inference and the second inference.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the electronic device (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the electronic device (100). Further, the communicator (140) is configured to facilitate the communication between the electronic device (100) and other devices via one or more networks (e.g. Radio technology). The communicator (140) includes an electronic circuit specific to a standard that enables wired or wireless communication.

A function associated with ML model (150) may be performed through the non-volatile/volatile memory (120), and the processor (130). The one or a plurality of processors (130) control the processing of the input data in accordance with a predefined operating rule or the ML model (150) stored in the non-volatile/volatile memory (120). The predefined operating rule or the ML model (150) is provided through training or learning. Here, being provided through learning means that, by applying a learning method to a plurality of learning data, the predefined operating rule or the ML model (150) of a desired characteristic is made. The learning may be performed in the electronic device (100) itself in which the ML model (150) according to an embodiment is performed, and/or may be implemented through a separate server/system. The ML model (150) may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning method is a method for training a predetermined target device (for example, a robot) using a plurality of learning data to cause, allow, or control the target device to make a determination or prediction. Examples of the learning method include, but are not limited to, supervised learning, unsupervised learning, semi-supervised learning, or reinforcement learning.

The ML model (150) is trained with independent color space. Each channel has independent data to other channel which indicates that the independent data can be processed together or separately giving same results. An effective receptive field of the ML model (150) can be changed by training in said manner just by changing the input channel format. For local/fine mode of operation, the electronic device (100) performs spatial folding on all of $4^i$ input channels together to divide in to $4^m$ inference channels of the ML model (150), where i<m, where i and m are positive integers. Global/coarse mode of operation, the electronic device (100) restructures $4^i$ input channels differently. Each of the individual $4^i$ input channel of the input vector is processed separately. Each individual input channels is broken in to $4^m$ inference channels of the ML model (150), which provides equivalent receptive field to even a high-resolution data with same ML model (150). Each output of the individual input vector channels after processing with the ML model (150) is collated to form final output. In this manner, by changing input vector structure, with same ML model (150) can work for both global and local scope of enhancement. Same procedure can be applied for coarser enhancement followed by fine enhancement by same ML model (150).

The channel restructuring engine (110) trains the ML model (150) with an independent color space receptive field with a 3×3 kernel at 1st convolution layer. The independent color space can be any color space where individual color channels are independent of each other. For smaller size input data (i.e. image with low resolution), the channel restructuring engine (110) replicates same data in $4^m$ inference channels. Further, the channel restructuring engine (110) processes all $4^i$ channels together with replication filling $4^m$ inference channels. Further, the channel restructuring engine (110) extracts only one instance of replicated outputs. In an embodiment, a best input restructuring strategy can also be determined with a pre-processing DNN unit, where the preprocessing unit takes multi-scale input or multi-spatial-folded inputs and processes to infer a score. The score indicates the extent/degree of the artefact to be restored. Further, the input restructuring using spatial folding (mentioned before) can be decided based on the score.

Although the FIG. 1 shows the hardware components of the electronic device (100) but it is to be understood that other embodiments are not limited thereon. In other embodiments, the electronic device (100) may include less or a greater number of components. Further, the labels or names of the components are used only for illustrative purpose and does not limit the scope of the disclosure. One or more components can be combined together to perform same or substantially similar function for restoring, enhancing, and segmenting the image.

Figure 2:
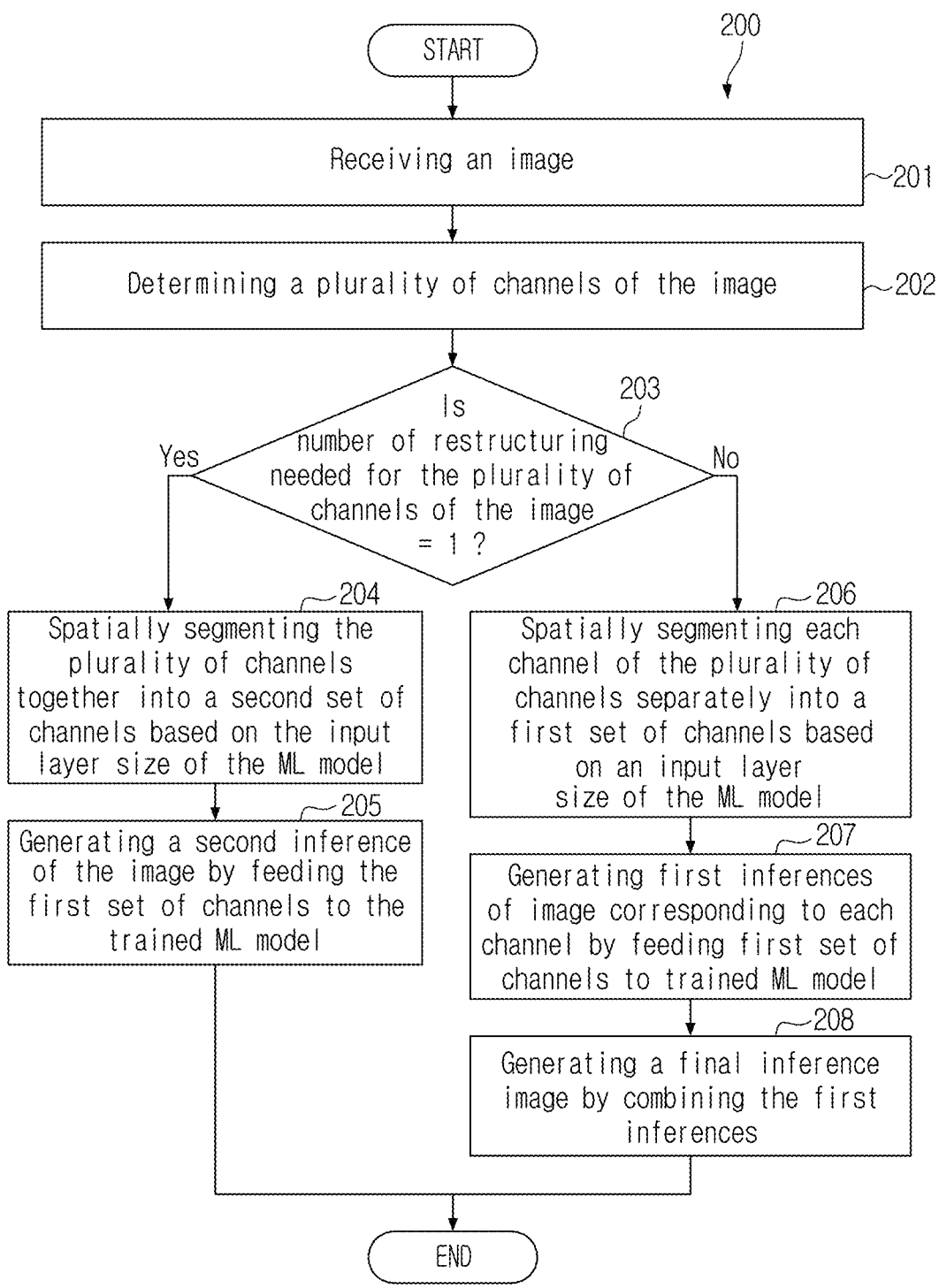
FIG. 2 is a flow diagram illustrating a method for multi-functional image restoration by the electronic device, according to an embodiment of the disclosure.

FIG. 2 is a flow diagram (200) illustrating a method for multi-functional image restoration by the electronic device (100), according to an embodiment of the disclosure. Referring to FIG. 2, the method allows the channel restructuring engine (110) to perform operations 201-208 of the flow diagram (200). At operation 201, the method includes receiving the image. At operation 202, the method includes determining the plurality of channels of the image. At operation 203, the method includes determining whether the number of restructuring needed for the plurality of channels of the image is one. At operation 204, the method includes restructuring the plurality of channels into the second set of channels based on the input layer size of the trained ML model (150) in response to determining that the number of restructuring needed for the plurality of channels of the image is one. At operation 205, the method includes generating the second inference of the image by feeding the second set of channels to the trained ML model (150).

At operation 206, the method includes restructuring each channel of the plurality of channels into the first set of channels based on the input layer size of the trained ML model (150) in response to determining that the number of restructuring needed for the plurality of channels of the image is not one. At operation 207, the method includes generating the first inferences of the image corresponding to each channel by feeding the first set of channels to the trained ML model (150). At operation 208, the method includes generating the final inference image by combining the first inferences.

Figure 3:
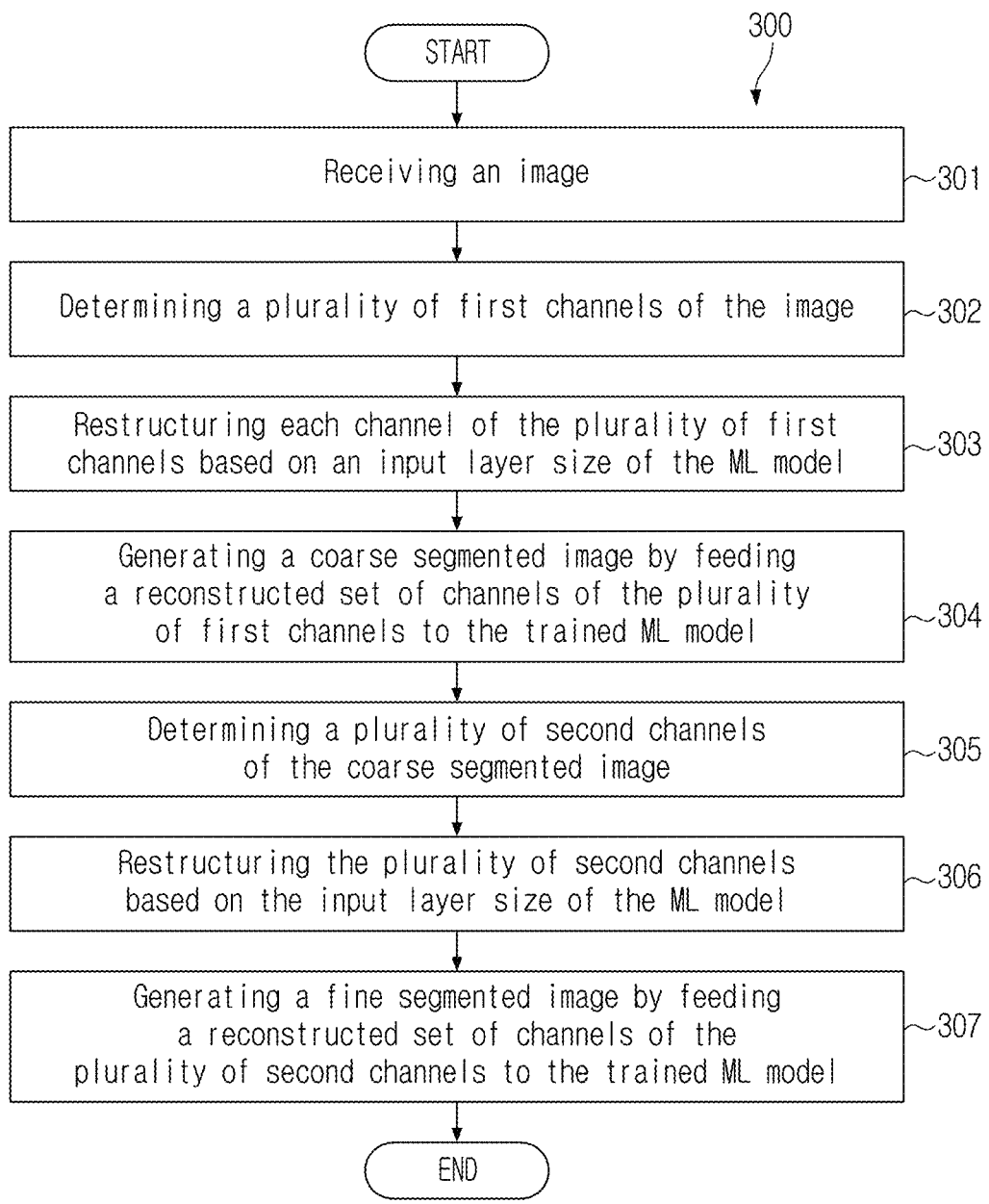
FIG. 3 is a flow diagram illustrating a method for image segmentation by the electronic device, according to an embodiment of the disclosure.

FIG. 3 is a flow diagram (300) illustrating a method for image segmentation by the electronic device (100), according to an embodiment of the disclosure. Referring to FIG. 3, the method allows the channel restructuring engine (110) to perform operations 301-307 of the flow diagram (300). At operation 301, the method includes receiving the image. At operation 302, the method includes determining the plurality of first channels of the image. At operation 303, the method includes restructuring each channel of the plurality of first channels based on the input layer size of the trained ML model (150). At operation 304, the method includes generating the coarse segmented image by feeding the reconstructed set of channels of the plurality of first channels to the trained ML model (150). At operation 305, the method includes determining the plurality of second channels of the coarse segmented image. At operation 306, the method includes restructuring the plurality of second channels based on the input layer size of the trained ML model (150). At operation 307, the method includes generating the fine segmented image by feeding the reconstructed set of channels of the plurality of second channels to the trained ML model (150).

Figure 4:
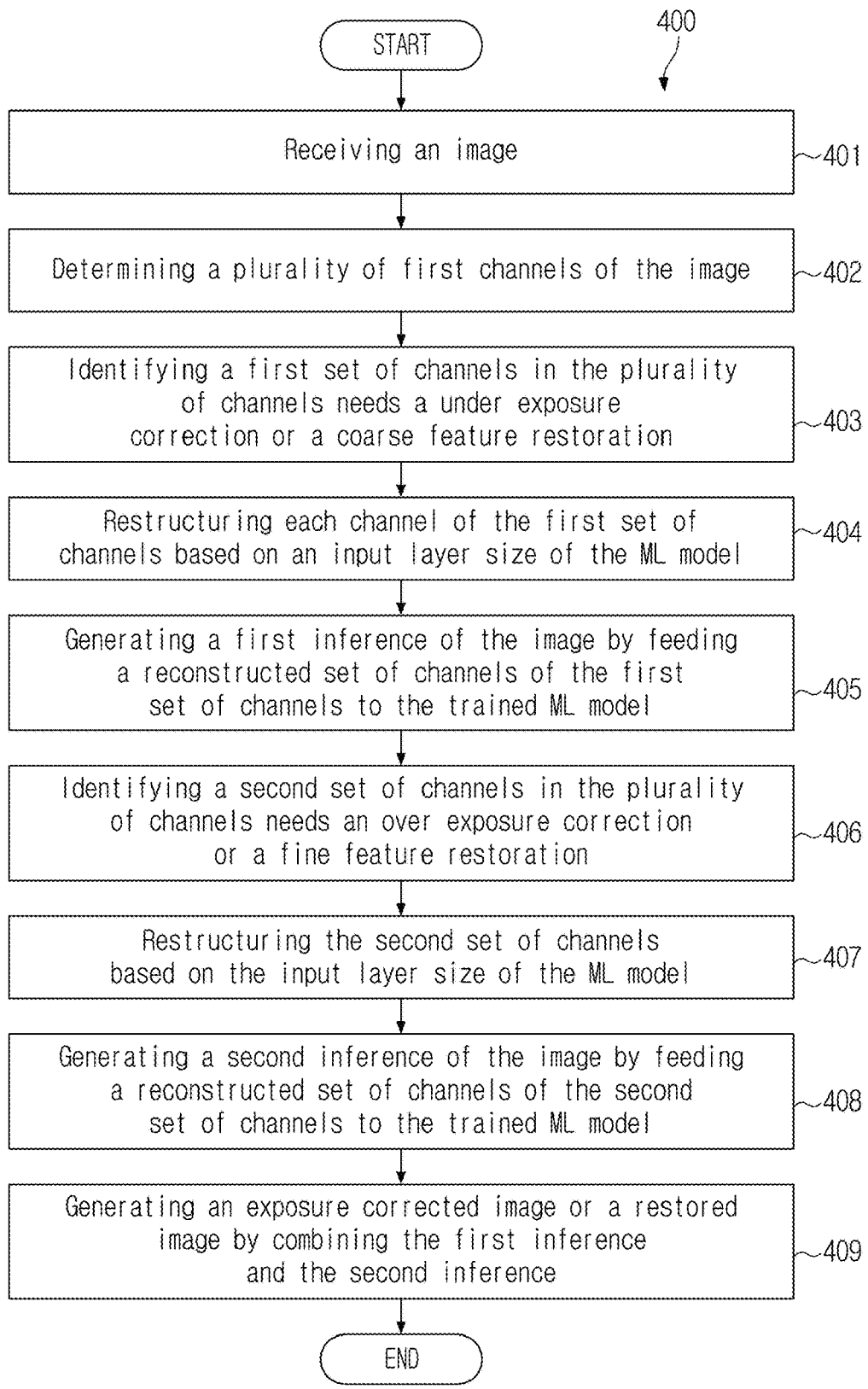
FIG. 4 is a flow diagram illustrating a method for multi-functional image enhancement by the electronic device, according to an embodiment of the disclosure.

FIG. 4 is a flow diagram (400) illustrating a method for multi-functional image enhancement by the electronic device (100), according to an embodiment of the disclosure. Referring to FIG. 4, the method allows the channel restructuring engine (110) to perform operations 401-409 of the flow diagram (400). At operation 401, the method includes receiving the image. At operation 402, the method includes determining the plurality of channels of the image. At operation 403, the method includes identifying the first set of channels in the plurality of channels needs the underexposure correction or the coarse feature restoration. At operation 404, the method includes restructuring each channel of the first set of channels based on the input layer size of the trained ML model (150). At operation 405, the method includes generating the first inference of the image by feeding the reconstructed set of channels of the first set of channels to the trained ML model (150). At operation 406, the method includes identifying the second set of channels in the plurality of channels needs the over exposure correction or the fine feature restoration. At operation 407, the method includes restructuring the second set of channels based on the input layer size of the trained ML model (150). At operation 408, the method includes generating the second inference of the image by feeding the reconstructed set of channels of the second set of channels to the trained ML model (150). At operation 409, the method includes generating the exposure corrected image or the restored image by combining the first inference and the second inference.

The various actions, acts, blocks, operations, or the like in the flow diagrams (200-400) may be performed in the order presented, in a different order, or simultaneously. Further, in some embodiments, some of the actions, acts, blocks, operations, or the like may be omitted, added, modified, skipped, or the like without departing from the scope of the disclosure.

Figure 5:
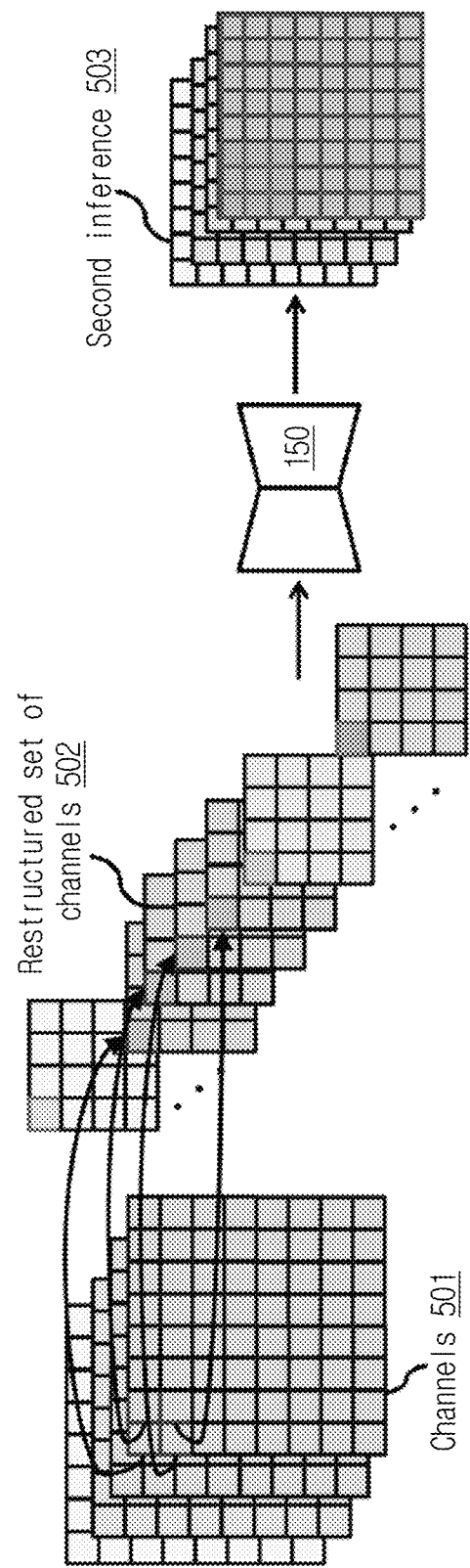
FIG. 5 is a schematic diagram illustrating a method of spatially segmenting all channels of the image together, according to an embodiment of the disclosure.

FIG. 5 is a schematic diagram illustrating a method of spatially segmenting all channels (501) of the image together, according to an embodiment of the disclosure. The channels (501) of the image are specially segmented to form the restructured set of channels (502). The clusters of pixels of each channel of the plurality of channels are segmented into individual set of channels in the pre-ordained pattern. The cluster size and the pattern are controlled based on the relation between the resolution of the plurality of channels and the size of input layer of the ML model (150). e.g. in case of a 2×2 cluster of RED pixels in a RED channel of the RGBA image, 2 adjacent pixels from a row and 2 adjacent pixel from following row which are also vertically adjacent to original 2 pixels, will be segmented and rearranged in to 4 individual channels: $RED_1$, $RED_2$, $RED_3$, $RED_4$. The next adjacent cluster is treated in the same way and the pixels belonging to it make up the adjacent pixels in channels: $RED_1$, $RED_2$, $RED_3$, $RED_4$. Same is followed for rest of Blur, Green and Alpha channels also. This is applied if the amount of restructuring required is 4 i.e. input resolution is 4 times the image resolution used during training the ML model (150). Upon feeding the restructured set of channels (502) the trained ML model (150), the channel restructuring engine (110) feeds the restructured set of channels (502) to the trained ML model (150) and generates the second inference (503) of the image without retraining/redesigning the trained ML model (150).

DNN is an example for the ML model (150) that has a 3×3 kernel at $1^{st}$ convolution layer. The DNN is trained with 3×3 filters that can achieve optimal results with significantly higher resolution input data of around 10 MP. For smaller resolution input data of around 1 MP, the same data can be replicated across inference channels and only one instance of the replicated input data can be taken out for optimal output. Thus, the proposed method provides a lot more flexibility than standard DNN networks. However, this approach is limited when subjected to extremely high spatial dimensions 108 MP. Proposed disclosure adds dynamic flexibility to this limitation where it can handle 1 MP~108 MP or ever larger.

Embodiments herein provide a method for producing optimal results of DNN inference from varying range of resolutions (e.g. 4 MP~108 MP) using same ML model (150) with modification training and input structuring strategy. In case of normal resolution image, restructuring of the input image to fill the input channels of the ML model (150) with all the channels of the input image. Filling all input channels of ML model (150) with all channels of input image samples smaller area of image which is equivalent to the receptive field of the ML model (150) in case of high-resolution input image. The method can be used for generating the output based on normal/high-resolution processed image.

Figure 6A:
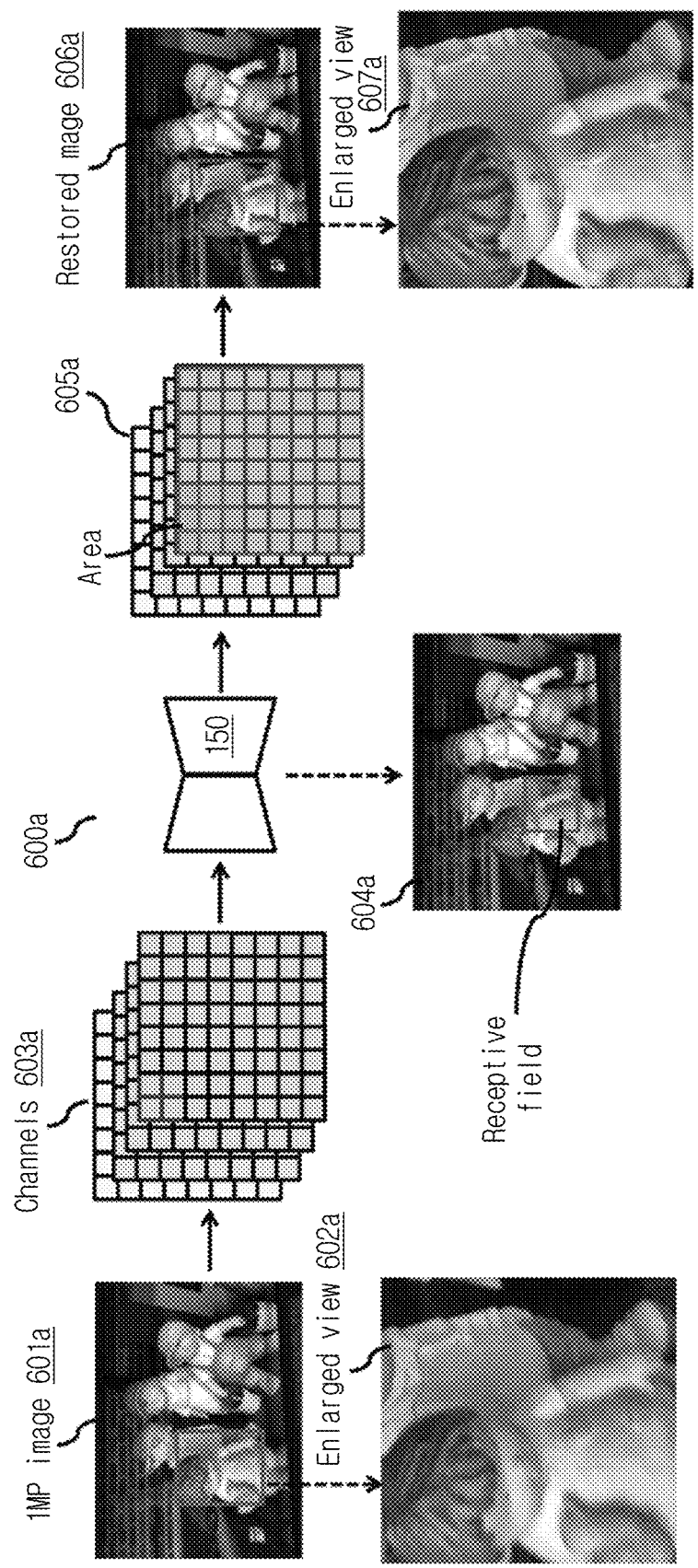
Figure 6B:
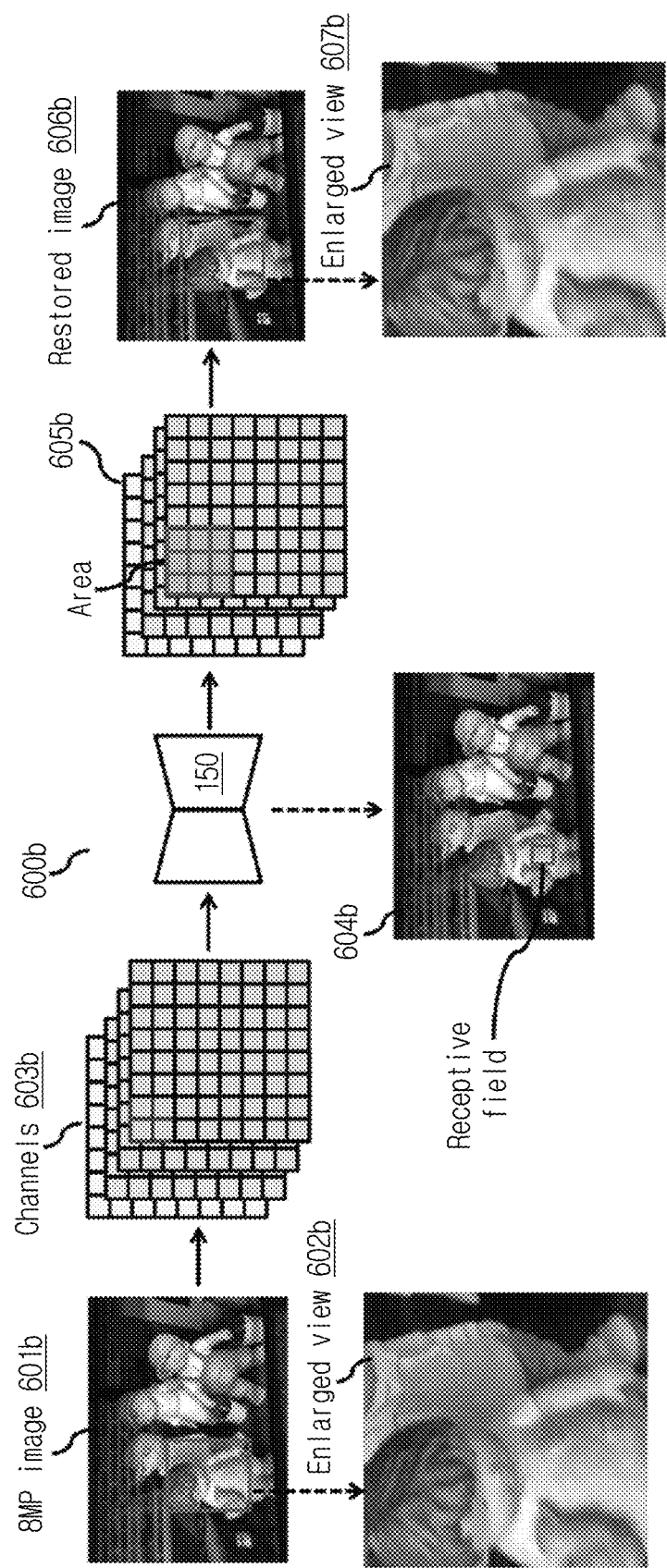

FIGS. 6A, 6B and 6C illustrate a comparison of handling images of different resolutions by a conventional device and the electronic device (100), according to various embodiments of the disclosure. Consider, the ML model (150) is trained with 3×3 filters that can achieve optimal results when input resolution is similar to training resolution i.e. ~1 MP. Notation (600a) of the FIG. 6A shows a restoration of a 1 MP image (601a) using the trained ML model (150) (e.g. Standard DNN) by the conventional device, where the 1 MP image (601a) is blurred (refer enlarged view (602a) of a small portion of the 1 MP image (601a)). The conventional device feeds the channels (603a) of the IMP image (601a) to the trained ML model (150). The receptive field of the trained ML model (150) with respect to a size of the 1 MP image (601a) is shown in notation (604a). The trained ML model (150) provides optimal output (605a), where the receptive field of the trained ML model (150) is large enough to process data of the 1 MP image (601a). Further, the conventional device generates a restored image (606a) using the optimal output (605a), where the restored image (606a) is very clear and not blurred (refer enlarged view (607a) of a small portion of the restored image (606a)).

Notation (600b) of the FIG. 6B shows a restoration of an 8 MP image (601b) using the trained ML model (150) (e.g. Standard DNN) by the conventional device, where the 8 MP image (601b) is blurred (refer enlarged view (602b) of a small portion of the 8 MP image (601b)). The conventional device feeds the channels (603b) of the 8 MP image (601b) to the trained ML model (150). The receptive field of the trained ML model (150) with respect to a size of the 8 MP image (601b) is shown in notation (604b). The trained ML model (150) provides sub-optimal output (605b), where the receptive field of the trained ML model (150) is smaller to process data of the 8 MP image (601a). Further, the conventional device generates a restored image (606b) using the sub-optimal output (605b), where the restored image (606b) is still blurred (refer enlarged view (607b) of a small portion of the restored image (606b)).

When the ML model (150) is trained to handle higher resolution ~10 MP, then the ML model (150) will produce sub-optimal results with 1 MP input images due to multiple pooling, striding operations which will scale down meaningful information more than necessary for small inputs. One way to achieve good result with small image in that case would be to scale up input but that will not yield optimal results as well due to interpolated data.

Notation (600c) of the FIG. 6C shows a restoration of the 8 MP image (601c) using the trained ML model (150) (e.g. Standard DNN) by the electronic device (100), where the 8 MP image (601c) is blurred (refer enlarged view (602c) of a small portion of the 8 MP image (601c)). The electronic device (100) restructures the channels (603c) of the 8 MP image (601c) together to form the restructured set of channels (604c). Further, the electronic device (100) feeds restructured set of channels (604c) to the trained ML model (150). An effective receptive field of the trained ML model (150) with respect to a size of the 8 MP image (601c) is shown in notation (605c) due to restructuring the channels (603c) of the 8 MP image (601c). The trained ML model (150) provides the optimal output (606c), where the receptive field of the trained ML model (150) is large enough to process the restructured set of channels (604c) of the 8 MP image (601c). Further, the electronic device (100) generates a restored image (607c) using the optimal output (606c), where the restored image (607c) is very clear and not blurred (refer enlarged view (608c) of a small portion of the restored image (607c)).

The ML model (150) with spatial-folded input trained with 3×3 filters provides optimal output (606c) with the 8 MP image (601c). The optimal output (606c) on the large 8 MP data is due to compensation of the receptive field by spatially folding $4^i$ input channels to $4^m$ inference channels (i<m).

Figure 7:
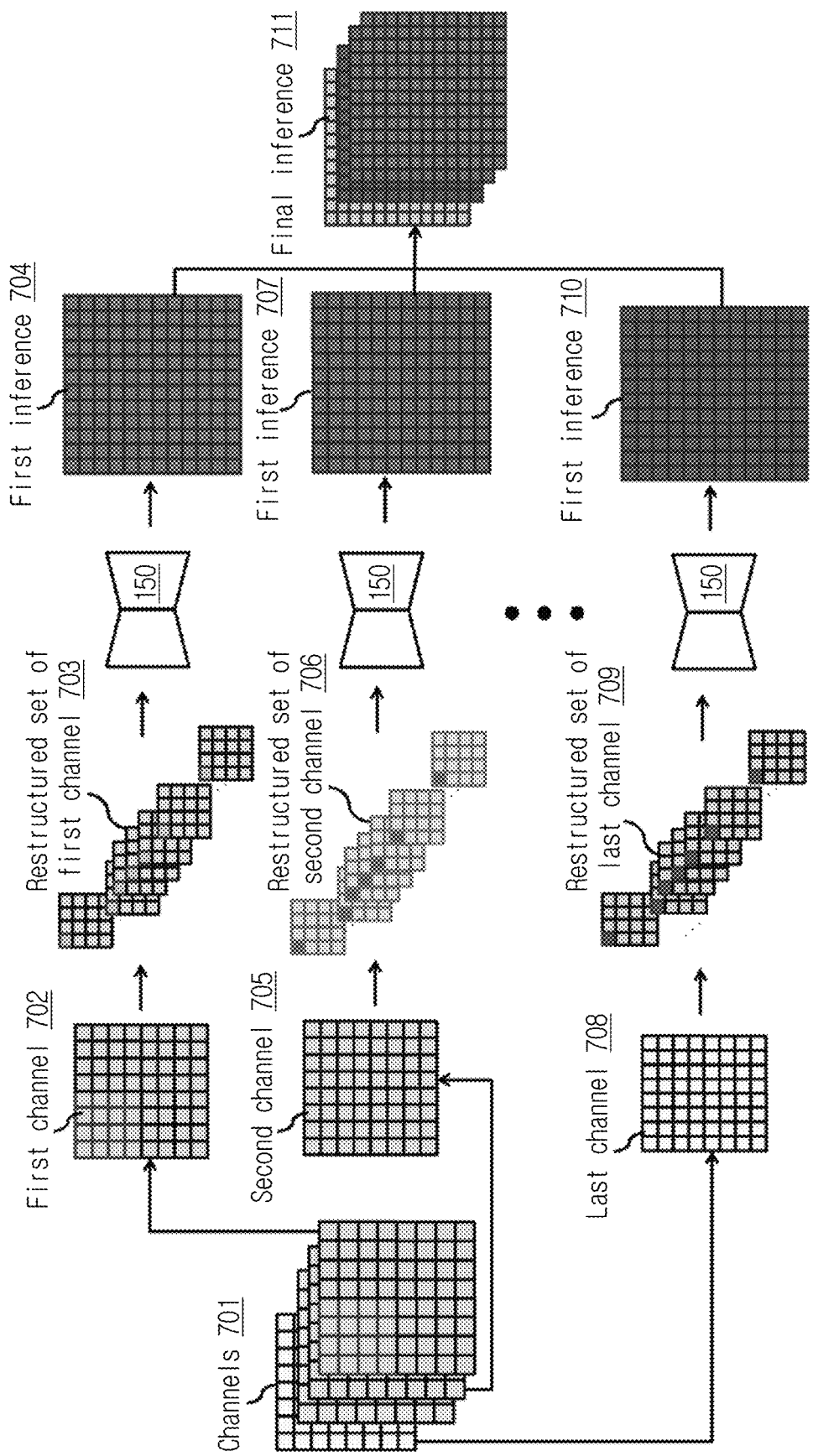
FIG. 7 is a schematic diagram illustrating a method of spatially segmenting each channel of the image separately by the electronic device, according to an embodiment of the disclosure.

FIG. 7 is a schematic diagram illustrating a method of spatially segmenting each channel of the image separately by the electronic device (100), according to an embodiment of the disclosure. The ML model (150) with adaptive spatial folding is trained with independent color space receptive field with a 3×3 kernel at $1^{st}$ convolution layer. The channel restructuring engine (110) restructures the channels (701) of the input image to process each channel (702-708) individually by each image channel to generate the restructured set of each channel (703-709) and filling all the input channels of the ML model (150). The clusters of pixels of each channel of the plurality of channels are segmented into individual set of channels in the pre-ordained pattern. The cluster size and the pattern are controlled by the relation between the resolution of the plurality of channels and the size of input layer of the ML model (150). e.g. in case of a 4×4 cluster of RED pixels in a RED channel of the RGBA image, 4 adjacent pixels from a row and 4 adjacent pixel from following 3 rows which are also vertically adjacent to the original 4 pixels, will be segmented and rearranged into 16 individual channels: $RED_1$, $RED_2$, $RED_3$, $RED_4$, $RED_5$, $RED_6$, $RED_7$, $RED_8$, $RED_9$, $RED_{10}$, $RED_{11}$, $RED_{12}$, $RED_{13}$, $RED_{14}$, $RED_{15}$, $RED_{16}$. The next adjacent cluster is treated in the same way and the pixels belonging to it make up the adjacent pixels in channels: $RED_1$, $RED_2$, $RED_3$, $RED_4$, $RED_5$, $RED_6$, $RED_7$, $RED_8$, $RED_9$, $RED_{10}$, $RED_{11}$, $RED_{12}$, $RED_{13}$, $RED_{14}$, $RED_{15}$, $RED_{16}$. Same is followed for rest of the Blur, Green and Alpha channels also. This is applied if number of channels expected in the input layer of the ML model (150) is 16 and provides a broader global contextual information 16× larger than the original processing resolution. The channel restructuring engine (110) fills all input channels of the ML model (150) with single channel of input image samples larger area of image. Further, the channel restructuring engine (110) generates first inferences (704-710) by providing equivalent receptive field to high-resolution images as normal images to the ML model (150). Further, the channel restructuring engine (110) generates the final inference (711) using the first inferences (704-710).

Figure 8B:
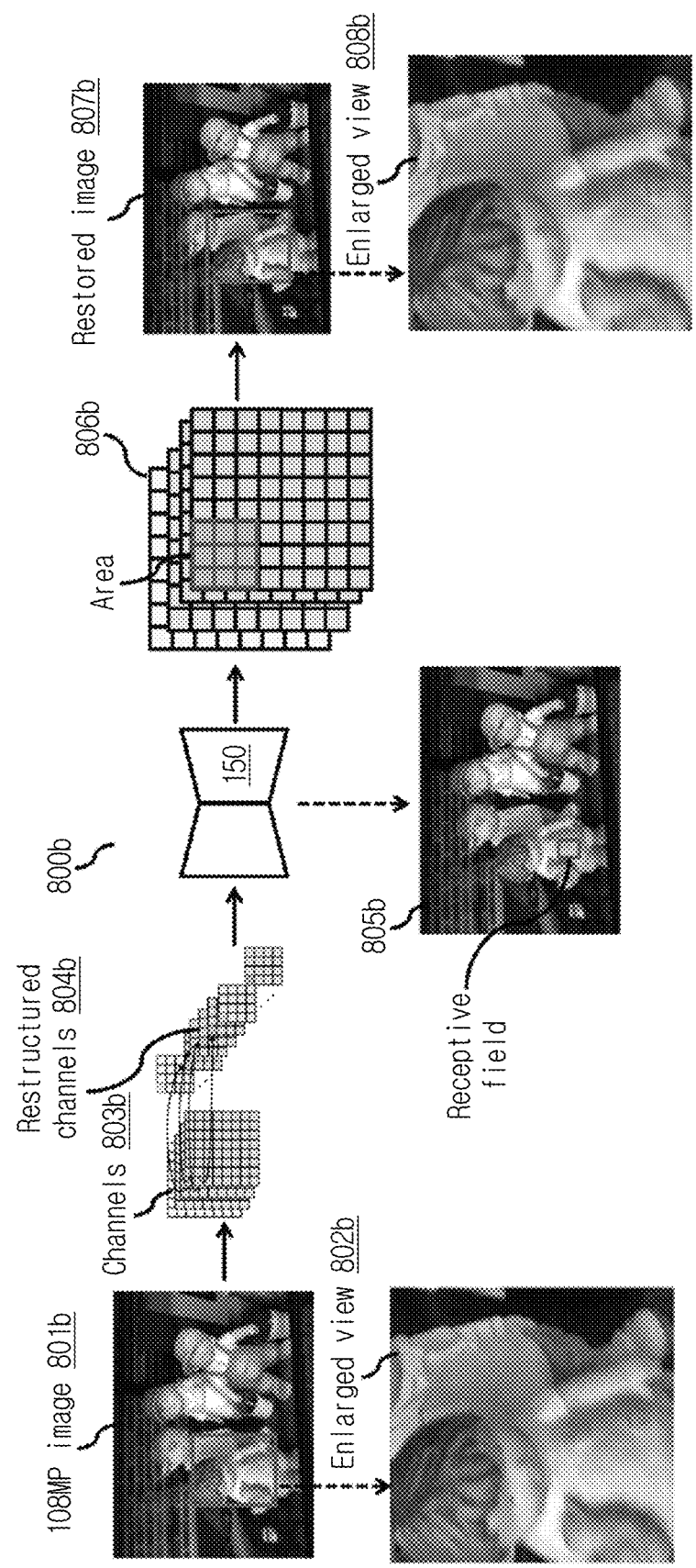
Figure 8C:
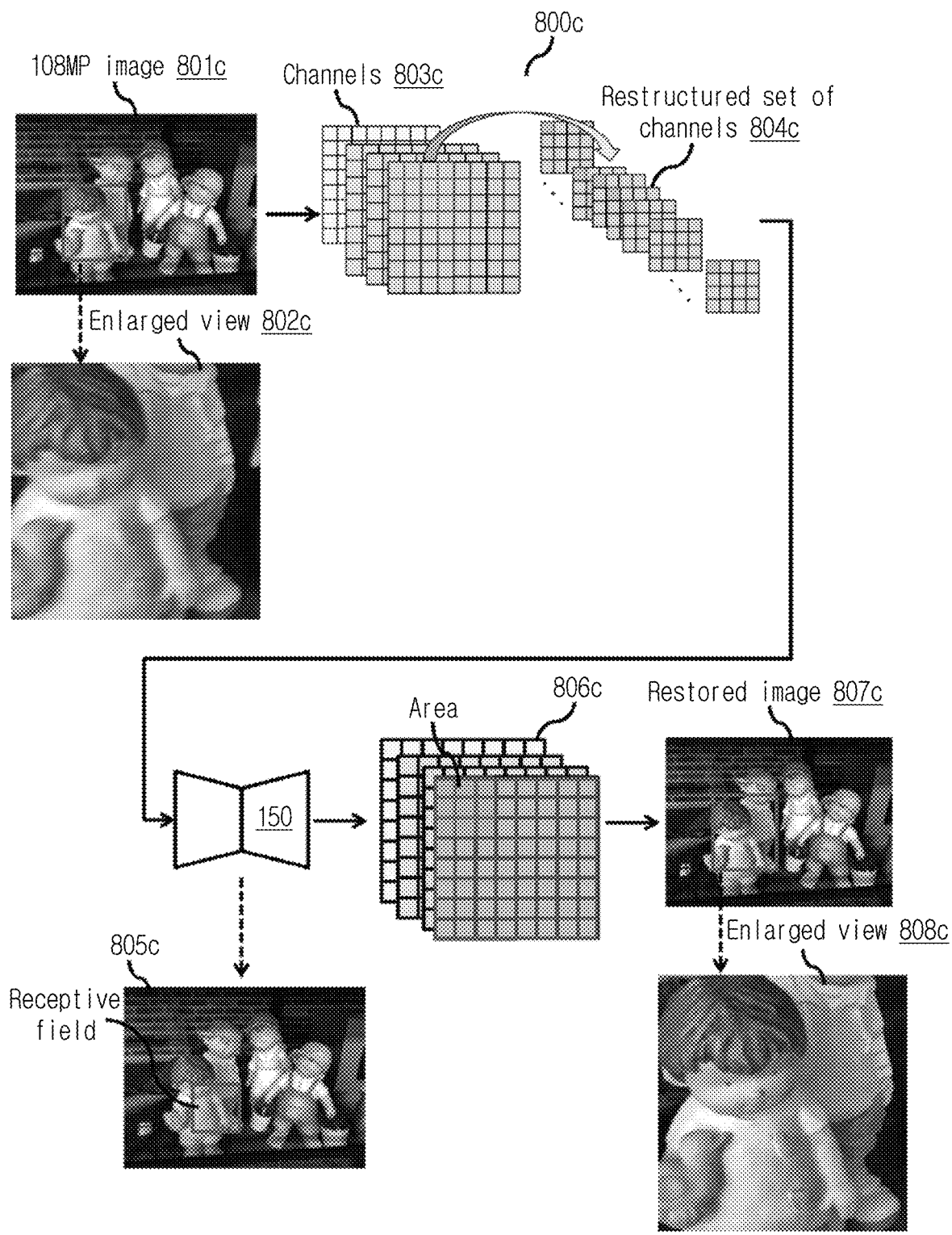

FIGS. 8A, 8B and 8C illustrate a comparison of handling the images of different resolutions by the conventional device and the proposed electronic device (100), according to various embodiments of the disclosure. Consider, the ML model (150) is trained with 3×3 filters that can achieve optimal results when input resolution is similar to training resolution i.e. ~8 MP. Optimal result on data larger than 8 MP due to compensation of the receptive field can be obtained by spatially folding $4^i$ input channels to $4^m$ inference channels (i<m). Notation (800a) of the FIG. 8A shows a restoration of an 8 MP image (801a) using the trained ML model (150) (e.g. Standard DNN) by the conventional device, where the 8 MP image (801a) is blurred (refer enlarged view (802a) of a small portion of the 8 MP image (801a)). The conventional device feeds the restructured channels (804a) of channels (803a) of the 8 MP image (801a) to the trained ML model (150). The receptive field of the trained ML model (150) with respect to a size of the 8 MP image (801a) is shown in notation (805a). The trained ML model (150) provides optimal output (806a), where the receptive field of the trained ML model (150) is large enough to process data of the 8 MP image (801a). Further, the conventional device generates a restored image (807a) using the optimal output (806a), where the restored image (807a) is very clear and not blurred (refer enlarged view (808a) of a small portion of the restored image (807a)).

Notation (800b) of the FIG. 8B shows a restoration of an 108 MP image (801b) using the trained ML model (150) (e.g. Standard DNN) by the conventional device, where the 108 MP image (801b) is blurred (refer enlarged view (802b) of a small portion of the 108 MP image (801b)). The conventional device feeds the restructured channels (804b) of channels (803b) of the 108 MP image (801b) to the trained ML model (150). The receptive field of the trained ML model (150) with respect to the size of the 108 MP image (801b) is shown in notation (805b). The trained ML model (150) provides sub-optimal output (806b), where the receptive field of the trained ML model (150) is smaller to process data of the 108 MP image (801b). The sub-optimal output (806b) of the 108 MP data is due to non-adaptive nature of spatial-folding block, training strategy and input data. Further, the conventional device generates a restored image (807b) using the sub-optimal output (806b), where the restored image (807b) is still blurred (refer enlarged view (808b) of a small portion of the restored image (807b)).

Notation (800c) of the FIG. 8C shows a restoration of the 108 MP image (801c) using the trained ML model (150) (e.g. Standard DNN) by the electronic device (100), where the 108 MP image (801c) is blurred (refer enlarged view (802c) of a small portion of the 108 MP image (801c)). The electronic device (100) restructures the channels (803c) of the 108 MP image (801c) separately to form the restructured set of channels (804c). Further, the electronic device (100) feeds the restructured set of channels (804c) to the trained ML model (150). The effective receptive field of the trained ML model (150) with respect to the size of the 108 MP image (801c) is shown in notation (805c) due to restructuring the channels (803c) of the 108 MP image (801c). The trained ML model (150) provides the optimal output (806c), where the receptive field of the trained ML model (150) is large enough to process the restructured set of channels (804c) of the 108 MP image (801c). The trained ML model (150) generates the optimal output (806c) when $4^i$ input channels are processed individually folded into $4^m$ inference channels. Further, the electronic device (100) generates a restored image (807c) using the optimal output (806c), where the restored image (807c) is very clear and not blurred (refer enlarged view (808c) of a small portion of the restored image (807c)).

Figure 9:
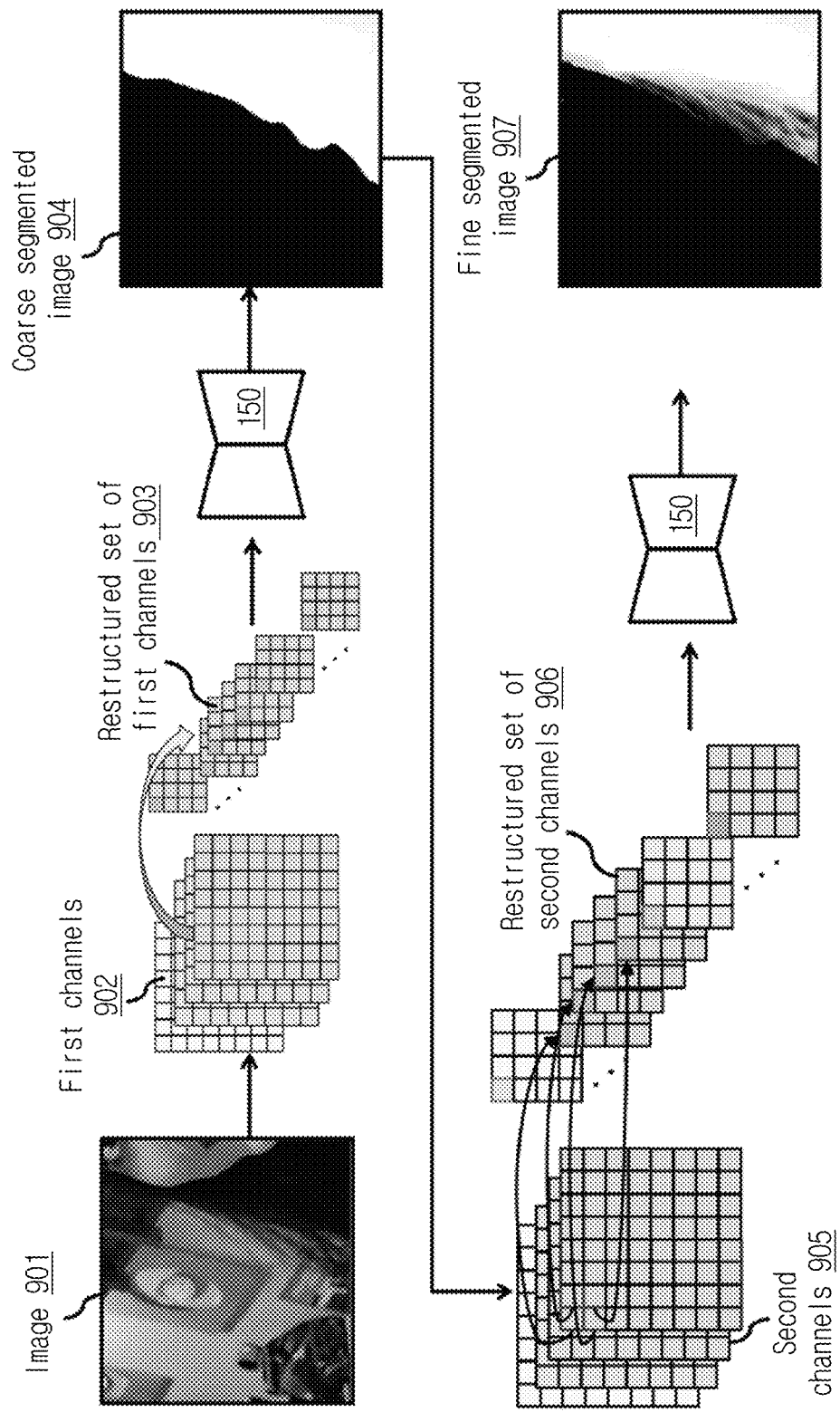
FIG. 9 illustrates an example scenario of the image segmentation, according to an embodiment of the disclosure.

FIG. 9 illustrates an example scenario of the image segmentation, according to an embodiment of the disclosure. The channel restructuring engine (110) receives the image (901) with the arbitrary resolution. Further, the channel restructuring engine (110) determines the plurality of first channels (902) of the image (901). Further, the channel restructuring engine (110) restructures each channel of the plurality of first channels (902) based on the input layer size of the trained ML model (150) to provide coarser but broader contextual segmentation information to the ML model (150). Further, the channel restructuring engine (110) generates the coarse segmented image (904) by feeding the reconstructed set of channels (903) of the plurality of first channels (902) to the trained ML model (150). Further, the channel restructuring engine (110) determines the plurality of second channels (905) of the coarse segmented image (904). Further, the channel restructuring engine (110) restructures the plurality of second channels (905) based on the input layer size of the trained ML model (150) to provide detailed but narrower segmentation information to the ML model (150). Further, the channel restructuring engine (110) generates the fine segmented image (907) by feeding the reconstructed set of channels (906) of the plurality of second channels (905) to the trained ML model (150).

In an embodiment, the method of image segmentation (also matting of foreground object in images) includes sequential tasks like coarse and fine refinement. Coarse refinement for initial output can be done with each of the input channels spatially folded into inference channels. This coarse refinement needs global context with maximum global context possible. After $1^{st}$ output the same can be used in the $2^{nd}$ pass with the same ML model (150) with all input channels folded into inference channels together for refining finer details. This mode may require local context to work with lower receptive field. In this manner one single ML model (150) can be used to achieve two different tasks of contrasting nature just by restructuring the input.

In another embodiment, the method of image segmentation includes receiving one or more images for segmentation with first set of input channels. Further, the method incudes analyzing received images for processing based on local/fine features [LF] and global/course features [GF]. Further, the method incudes pre-processing the input images to restructure the channels based on the analysis. Further, the method incudes building the ML model (150) with input and output layer with a $2^{nd}$ set of channels greater than the input image channels. Further, the method incudes training the ML model (150) in a color space where each image channel is independent. Further, the method incudes restructuring the input image to process each channel individually by each image channel filling all the input channels of the ML model (150). Further, the method incudes filling all input channels of the ML model (150) with single channel of input image samples larger area of image (global scope) but with coarse result. Further, the method incudes using global features for coarse segmentation for each input channel. Further, the method incudes processing the restructured input for global scope using the ML model (150) to generate coarse output. Further, the method incudes combining the individually processed channels of the coarse output to form the coarse segmentation image. Further, the method incudes restructuring the coarse output to fill the input channels of the ML model (150) with all the channels of the coarse output. Further, the method incudes filling all input channels of the ML model (150) with all channels of coarse output samples smaller area of image (local scope) but with finer precision. Further, the method incudes using local features for finer refinement of coarse segmented mask for all channel together. Further, the method incudes receiving output from all channels to get a final fine segmentation output.

Figure 10:
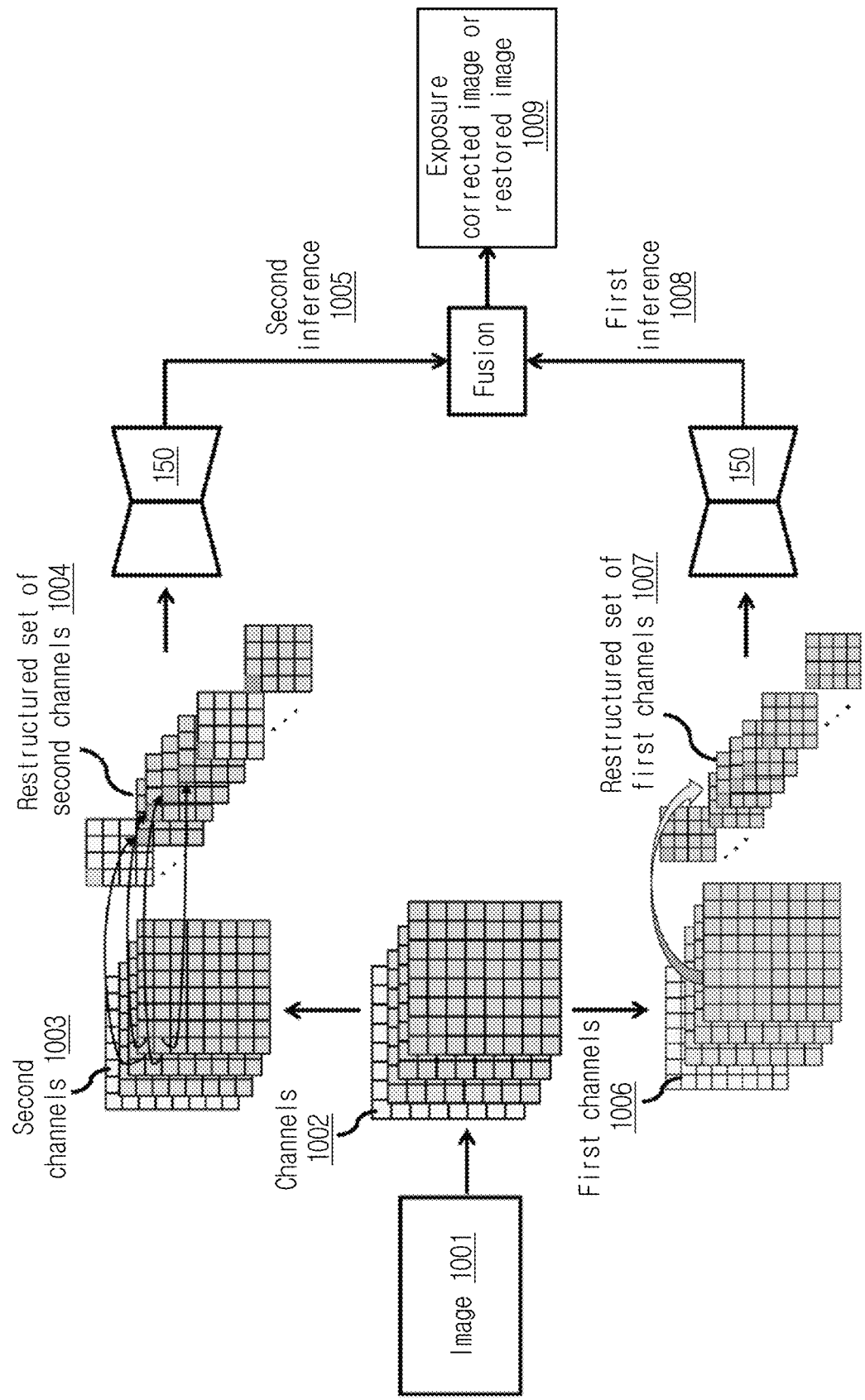
FIG. 10 illustrates an example scenario of the multi-functional image enhancement, according to an embodiment of the disclosure.

FIG. 10 illustrates an example scenario of the multi-functional image enhancement, according to an embodiment of the disclosure. The channel restructuring engine (110) receives the image (1001) with the arbitrary resolution. Further, the channel restructuring engine (110) determines the plurality of channels (1002) of the image (1001). Further, the channel restructuring engine (110) identifies the first set of channels (1006) in the plurality of channels (1002) needs the under-exposure correction or the coarse feature restoration. Further, the channel restructuring engine (110) restructures each channel of the first set of channels (1006) based on the input layer size of the trained ML model (150) to provide the global contextual information to the ML model (150). Further, the channel restructuring engine (110) generates the first inference (1008) of the image (1001) by feeding the reconstructed set of channels (1007) of the first set of channels (1006) to the trained ML model (150).

Further, the channel restructuring engine (110) identifies the second set of channels (1003) in the plurality of channels (1002) needs the over exposure correction or the fine feature restoration. Further, the channel restructuring engine (110) restructures the second set of channels (1003) based on the input layer size of the trained ML model (150) to provide the local contextual information to the ML model (150). Further, the channel restructuring engine (110) generates the second inference (1005) of the image by feeding the reconstructed set of channels (1004) of the second set of channels (1003) to the trained ML model (150). Further, the channel restructuring engine (110) generates the exposure corrected image or a restored image (1009) by combining the first inference (1008) and the second inference (1005).

For tasks like over exposure correction, which can be done with local context the whole $4^i$ input channels can be processed folded into $4^m$ inference channels. While under exposure correction, which needs global context can also be processed with the same ML model (150) with each $4^i$ individual input channel processed spatially folded in to $4^m$ inference channels. Tasks can be done either one at a time or in-parallel, by using multiple instances of same ML model (150).

In another embodiment, the method of multi-functional image exposure enhancement includes receiving one or more images for exposure enhancement with first set of input channels. Further, the method includes analyzing received images for processing based on local and global features. Further, the method includes pre-processing the input images to restructure the channels based on the analysis. Further, the method includes building the ML model (150) with input and output layer with a $2^{nd}$ set of channels greater than the input image channels. Further, the method includes training the ML model (150) in a color space where each image channel is independent. Further, the method includes restructuring the input image to process each channel individually by each image channel filling all the input channels of the ML model (150). Further, the method includes filling all input channels of the ML model (150) with single channel of input image samples larger area of image (global scope). Further, the method includes using the global features to process the Under Exposure (UE) enhancement for each input channel. Further, the method includes processing the restructured input for global scope using the ML model (150) to generate UE adjusted output. Further, the method includes restructuring the input image to fill the input channels of the ML model (150) with all the channels of the input image. Further, the method includes filling all input channels of the ML model (150) with all channels of input image samples smaller area of image (local scope) but with finer precision. Further, the method includes using local features for Over Exposure (OE) enhancement for all channel together. Further, the method includes combining the OE adjusted and UE adjusted images to give final exposure enhanced output.

In another embodiment, the method of for multi-functional image restoration includes receiving one or more images for restoration with first set of input channels. Further, the method includes analyzing the received images for processing based on local and global features. Further, the method includes pre-processing the input images to restructure the channels based on the analysis. Further, the method includes building the ML model (150) with input and output layer with a $2^{nd}$ set of channels greater than the input image channels. Further, the method includes training the ML model (150) in a color space where each image channel is independent. Further, the method includes restructuring the input image to process each channel individually by each image channel filling all the input channels of the ML model (150). Further, the method includes Filling all input channels of the ML model (150) with single channel of input image samples larger area of image (global scope). Further, the method includes using global features process the coarse feature restoration for each input channel. Further, the method includes processing the restructured input for global scope using the ML model (150) to generate coarse-restored output. Further, the method includes restructuring the input image to fill the input channels of the ML model (150) with all the channels of the input image. Further, the method includes filling all input channels of ML model (150) with all channels of input image samples smaller area of image (local scope) but with finer precision. Further, the method includes using local features for fine feature restoration for all channel together. Further, the method includes combining the coarse-restored and fine-restored images to give final restored output.

In an embodiment, the global scope refers to sampling and processing a very large if not full image area with in the receptive field of a single filter in the filter arrays of the ML model (150). In an embodiment, the global scope restorations are coarse in nature but uniform across the image. In some specific enhancements like over-exposure corrections need global scope for maintaining same exposure values across an image. In an embodiment, the local scope refers to sampling and processing a smaller local neighborhood of an image with the largest receptive field of a single filter in the filter arrays of the ML model (150). In an embodiment, the local scope operations are needed for detailed enhancement. The local scope enhancement can show non-uniform restoration across an image due to limited visibility and require assistance from global scope signals for optimal performance In an embodiment, usage of the image restoration ML model (150) in a very limiting environment where whole of the input vector cannot be processed at once. Inference is limited to patch-wise processing of input. Larger patches can be used by processing input with one channel folded across larger number of input channels of the channels of the ML model (150). Also, Larger patches can be used by processing input with on channel folded across larger number of input channels of the input channels of the ML model (150) for larger receptive field based on the nature of task or extent of restoration or both. Multiple copies of same ML model (150) can be used to process all the original individual channels of input separately for faster inference.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing multi-functional image restoration by an electronic device with a trained Machine Learning (ML) model, the method comprising:
   receiving, by the electronic device, an image;
   determining, by the electronic device, a plurality of channels of the image;
   determining, by the electronic device, whether a number of restructuring needed for the plurality of channels of the image is one; and
   performing, by the electronic device:
      in response to determining that the number of restructuring needed for the plurality of channels of the image is not one, restructuring each channel of the plurality of channels into a first set of channels based on an input layer size of the trained ML model, generating first inferences of the image corresponding to each channel by feeding the first set of channels to the trained ML model, and generating a final inference image by combining the first inferences, and
      in response to determining that the number of restructuring needed for the plurality of channels of the image is one, restructuring the plurality of channels into a second set of channels based on the input layer size of the trained ML model, and generating a second inference of the image by feeding the second set of channels to the trained ML model.

2. The method as claimed in claim 1, wherein the restructuring of each channel of the plurality of channels into the first set of channels based on the input layer size of the trained ML model, comprises:
   spatially segmenting, by the electronic device, each channel of the plurality of channels separately into the first set of channels based on the input layer size of the trained ML model.

3. The method as claimed in claim 1, wherein the restructuring of the plurality of channels into the second set of channels based on the input layer size of the trained ML model, comprises:
   spatially segmenting, by the electronic device, the plurality of channels together into the second set of channels based on the input layer size of the trained ML model.

4. A method for performing image segmentation by an electronic device with a trained Machine Learning (ML) model, the method comprising:
   receiving, by the electronic device, an image;
   determining, by the electronic device, a plurality of first channels of the image;
   restructuring, by the electronic device, each channel of the plurality of first channels based on an input layer size of the trained ML model;
   generating, by the electronic device, a coarse segmented image by feeding a reconstructed set of channels of the plurality of first channels to the trained ML model;
   determining, by the electronic device, a plurality of second channels of the coarse segmented image;

restructuring, by the electronic device, the plurality of second channels based on the input layer size of the trained ML model; and generating, by the electronic device, a fine segmented image by feeding a reconstructed set of channels of the plurality of second channels to the trained ML model.

5. The method as claimed in claim 4, wherein the restructuring of each channel of the plurality of first channels based on an input layer size of the trained ML model, comprises:
spatially segmenting, by the electronic device, each channel of the plurality of first channels separately based on the input layer size of the trained ML model.

6. The method as claimed in claim 4, wherein the restructuring of the plurality of second channels based on the input layer size of the trained ML model, comprises:
spatially segmenting, by the electronic device, the plurality of second channels together based on the input layer size of the trained ML model.

7. A method for performing multi-functional image enhancement by an electronic device with a trained Machine Learning (ML) model, the method comprising:
receiving, by the electronic device, an image;
determining, by the electronic device, a plurality of channels of the image;
identifying, by the electronic device, a first set of channels in the plurality of channels needs a under exposure correction or a coarse feature restoration;
restructuring, by the electronic device, each channel of the first set of channels based on an input layer size of the trained ML model;
generating, by the electronic device, a first inference of the image by feeding a reconstructed set of channels of the first set of channels to the trained ML model;
identifying, by the electronic device, a second set of channels in the plurality of channels needs an over exposure correction or a fine feature restoration;
restructuring, by the electronic device, the second set of channels based on the input layer size of the trained ML model;
generating, by the electronic device, a second inference of the image by feeding a reconstructed set of channels of the second set of channels to the trained ML model; and
generating, by the electronic device, an exposure corrected image or a restored image by combining the first inference and the second inference.

8. The method as claimed in claim 7, wherein the restructuring of each channel of the first set of channels based on the input layer size of the trained ML model, comprises:
spatially segmenting, by the electronic device, each channel of the first set of channels separately based on the input layer size of the trained ML model.

9. The method as claimed in claim 7, wherein the restructuring of the second set of channels based on the input layer size of the trained ML model,
spatially segmenting, by the electronic device, the second set of channels together based on the input layer size of the trained ML model.

10. An electronic device for performing multi-functional image restoration with a trained Machine Learning (ML) model, the electronic device comprising:
a memory;
a processor;
the trained ML model; and
a channel restructuring engine, coupled to the memory, wherein the processor is configured to:
receive an image,
determine a plurality of channels of the image,
determine whether a number of restructuring needed for the plurality of channels of the image is one, and perform:
in response to determining that the number of restructuring needed for the plurality of channels of the image is not one, restructure each channel of the plurality of channels into a first set of channels based on an input layer size of the trained ML model, generate first inferences of the image corresponding to each channel by feeding the first set of channels to the trained ML model, and generate a final inference image by combining the first inferences, and
in response to determining that the number of restructuring needed for the plurality of channels of the image is one, restructure the plurality of channels into a second set of channels based on the input layer size of the trained ML model, and generate a second inference of the image by feeding the second set of channels to the trained ML model.

11. The electronic device as claimed in claim 10, wherein the processor is further configured to spatially segment each channel of the plurality of channels separately into the first set of channels based on the input layer size of the trained ML model.

12. The electronic device as claimed in claim 10, wherein the processor is further configured to spatially segment the plurality of channels together into the second set of channels based on the input layer size of the trained ML model.

13. An electronic device for performing image segmentation with a trained Machine Learning (ML) model, the electronic device comprising:
a memory;
a processor;
the trained ML model; and
a channel restructuring engine, coupled to the memory, wherein the processor is configured to:
receive an image,
determine a plurality of first channels of the image,
restructure each channel of the plurality of first channels based on an input layer size of the trained ML model,
generate a coarse segmented image by feeding a reconstructed set of channels of the plurality of first channels to the trained ML model,
determine a plurality of second channels of the coarse segmented image,
restructure the plurality of second channels based on the input layer size of the trained ML model, and
generate a fine segmented image by feeding a reconstructed set of channels of the plurality of second channels to the trained ML model.

14. The electronic device as claimed in claim 13, wherein the processor is further configured to spatially segment each channel of the plurality of first channels separately based on the input layer size of the trained ML model.

15. The electronic device as claimed in claim 13, wherein the processor is further configured to spatially segment the plurality of second channels together based on the input layer size of the trained ML model.

16. An electronic device for multi-functional image enhancement with a trained Machine Learning (ML) model, the electronic device comprising:
a memory;
a processor;
the trained ML model; and a channel restructuring engine, coupled to the memory,
wherein the processor is configured to:
  receive an image,
  determine a plurality of channels of the image,
  identify that a first set of channels in the plurality of channels needs a under exposure correction or a coarse feature restoration,
  restructure each channel of the first set of channels based on an input layer size of the trained ML model,
  generate a first inference of the image by feeding a reconstructed set of channels of the first set of channels to the trained ML model,
  identify that a second set of channels in the plurality of channels needs an over exposure correction or a fine feature restoration,
  restructure the second set of channels based on the input layer size of the trained ML model,
  generate a second inference of the image by feeding a reconstructed set of channels of the second set of channels to the trained ML model, and
  generate an exposure corrected image or a restored image by combining the first inference and the second inference.

17. The electronic device as claimed in claim 16, wherein the processor is further configured to spatially segment each channel of the first set of channels separately based on the input layer size of the trained ML model.

18. The electronic device as claimed in claim 16, wherein the processor is further configured to spatially segment the second set of channels together based on the input layer size of the trained ML model.

* * * * *